United States Patent
Hwang et al.

(10) Patent No.: US 10,327,106 B2
(45) Date of Patent: Jun. 18, 2019

(54) METHOD AND APPARATUS FOR ESTIMATING POSITION IN A WIRELESS COMMUNICATION SYSTEM

(71) Applicant: Samsung Electronics Co., Ltd., Gyeonggi-do (KR)

(72) Inventors: Won-Joon Hwang, Suwon-si (KR); Hyun-Seok Ryu, Yongin-si (KR); Jeong-Ho Park, Seoul (KR); Peng Xue, Hwaseong-si (KR); Sang-Won Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/505,903

(22) PCT Filed: Sep. 7, 2016

(86) PCT No.: PCT/KR2016/010035
§ 371 (c)(1),
(2) Date: Feb. 22, 2017

(87) PCT Pub. No.: WO2017/043867
PCT Pub. Date: Mar. 16, 2017

(65) Prior Publication Data
US 2019/0090092 A1 Mar. 21, 2019

(30) Foreign Application Priority Data

Sep. 10, 2015 (KR) .................. 10-2015-0128098

(51) Int. Cl.
*H04W 24/00* (2009.01)
*H04W 4/029* (2018.01)
(Continued)

(52) U.S. Cl.
CPC .......... *H04W 4/029* (2018.02); *G01S 5/0081* (2013.01); *G01S 5/14* (2013.01)

(58) Field of Classification Search
CPC ..... H04W 4/029; H04W 64/00; H04W 72/12; G01S 5/00; G01S 5/0081; G01S 5/14
(Continued)

(56) References Cited

U.S. PATENT DOCUMENTS 9,100,781 B2 * 8/2015 Woo ...................... G01S 5/0205
9,294,875 B2 * 3/2016 Ahn ...................... G01S 5/0236
(Continued)

FOREIGN PATENT DOCUMENTS

WO 2013-036060 A1 3/2013
WO 2013-137645 A1 9/2013
(Continued)

OTHER PUBLICATIONS

Baoguo Yang, "Timing Recovery for OFDM Transmission," IEEE Journal on Selected Areas in Communications, vol. 18, No. 11, Nov. 11, 2000, pp. 2278-2291.

*Primary Examiner* — Marceau Milord

(57) ABSTRACT

The present disclosure relates to a $5^{th}$ generation (5G) or pre-5G communication system for supporting higher data rates than a $4^{th}$ generation (4G) communication system such as long term evolution (LTE). A method for positioning a user equipment (UE) in a wireless communication system includes receiving a reference signal (RS) in a first bandwidth from each of a plurality of anchor nodes scheduled for RS transmission by a network server, determining whether a path overlap has occurred between the UE and the anchor nodes based on symmetry of channel impulse responses of the received RSs, transmitting a bandwidth extension request message to the network server, upon occurrence of a path overlap, receiving an RS in a second bandwidth larger than the first bandwidth from each of the plurality of anchor
(Continued)

nodes in response to the transmission of the bandwidth extension request message, and generating information required to position the UE, using the RSs received in the second bandwidth.

20 Claims, 13 Drawing Sheets

(51) Int. Cl.
G01S 5/00 (2006.01)
G01S 5/14 (2006.01)

(58) Field of Classification Search
USPC ............ 455/456.1, 456.3, 450, 404.2, 456.2
See application file for complete search history.

(56) References Cited

U.S. PATENT DOCUMENTS

| | | | | |
|---|---|---|---|---|
| 9,510,381 | B2* | 11/2016 | Kim | H04W 76/14 |
| 9,736,629 | B2* | 8/2017 | Woo | G01S 5/0205 |
| 9,736,648 | B2* | 8/2017 | Lim | G01S 5/0236 |
| 9,894,591 | B2* | 2/2018 | Chung | H04W 76/14 |
| 9,955,449 | B2* | 4/2018 | Kang | G01S 5/02 |
| 10,111,262 | B2* | 10/2018 | Choi | H04L 5/0053 |
| 10,129,842 | B2* | 11/2018 | Jeong | H04W 52/242 |
| 2013/0122930 | A1 | 5/2013 | Woo et al. | |
| 2014/0235273 | A1 | 8/2014 | Ahn et al. | |
| 2014/0295883 | A1 | 10/2014 | Kang et al. | |
| 2015/0072708 | A1 | 3/2015 | Lim et al. | |
| 2015/0189610 | A1* | 7/2015 | Siomina | G01S 5/021 370/280 |
| 2015/0296359 | A1* | 10/2015 | Edge | H04W 4/02 455/404.2 |
| 2015/0326359 | A1* | 11/2015 | Subramanian | H04L 5/0023 370/330 |
| 2015/0341872 | A1* | 11/2015 | Ryu | H04L 43/04 370/350 |
| 2015/0365155 | A1* | 12/2015 | Subramanian | H04B 7/0697 370/329 |
| 2015/0365790 | A1* | 12/2015 | Edge | H04W 4/90 455/404.2 |
| 2016/0050534 | A1 | 2/2016 | Lim et al. | |
| 2016/0142898 | A1* | 5/2016 | Poitau | H04W 76/14 370/329 |
| 2017/0094621 | A1* | 3/2017 | Xu | H04W 56/001 |
| 2017/0208560 | A1* | 7/2017 | Papa | H04W 56/006 |

FOREIGN PATENT DOCUMENTS

| | | |
|---|---|---|
| WO | 2013-172588 A1 | 11/2013 |
| WO | 2014-106976 A1 | 7/2014 |

* cited by examiner

METHOD AND APPARATUS FOR ESTIMATING POSITION IN A WIRELESS COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2016/010035 filed Sep. 7, 2016, entitled "METHOD AND APPARATUS FOR ESTIMATING POSITION IN A WIRELESS COMMUNICATION SYSTEM", and, through International Patent Application No. PCT/KR2016/010035, to Korean Patent Application No. 10-2015-0128098 filed Sep. 10, 2015, each of which are incorporated by reference into the present disclosure as if fully set forth herein.

TECHNICAL FIELD

The present disclosure relates to a method and apparatus for positioning a terminal in a wireless communication system.

BACKGROUND ART

To satisfy the growing demands for wireless data traffic since commercialization of a $4^{th}$ generation (4G) communication system, efforts have been made to develop an improved $5^{th}$ generation (5G) or pre-5G communication system. That is why the 5G or pre-5G communication system is called a beyond 4G network communication system or a post long term evolution (post LTE) system.

To achieve high data rates, deployment of the 5G communication system in a millimeter wave (mmWave) band (for example, 60 GHz) is under consideration. In order to mitigate propagation path loss and increase a propagation distance in the mmWave band, beamforming, massive multiple input multiple output (massive MIMO), full dimensional MIMO (FD-MIMO), array antenna, analog beamforming, and large-scale antenna technology have been discussed for the 5G communication system.

Further, to improve a system network, techniques such as evolved small cell, advanced small cell, cloud radio access network (cloud RAN), ultra-dense network, device-to-device (D2D) communication, wireless backhaul, moving network, cooperative communication, coordinated multi-point (CoMP), and interference cancellation have been developed for the 5G communication system.

Besides, advanced coding modulation (ACM) techniques such as hybrid FSK and QAM modulation (FQAM) and sliding window superposition coding (SWSC), and advanced access techniques such as filter bank multi carrier (FBMC) and non-orthogonal multiple access (NOMA), and sparse code multiple access (SCMA) have been developed for the 5G communication system.

To satisfy the growing demands for wireless data traffic since commercialization of a 4G communication system, efforts have been made to develop an improved 5G or pre-5G communication system. That is why the 5G or pre-5G communication system is called a beyond 4G network communication system or a post LTE system.

Owing to the development of mobile communication technology, mobile communication users have rapidly been increasing in number. The federal communication commission (FCC) presented high requirements (a positioning error range within 3 m) in relation to measurement of the position of a user (hereinafter, referred to "positioning"), for public safety of mobile communication users. Further, along with the emergence of the Internet of things (IoT) and various positioning-based services, there is a pressing need for a high-accuracy positioning technique with an error range within 1 m indoors and outdoors. Therefore, a leading organization working on standardization of mobile communication technology, $3^{rd}$ generation partnership project (3GPP) is studying various positioning techniques that satisfy the requirements of the FCC. The 3GPP mainly considers improvement of indoor and outdoor positioning performance by a wireless communication-based positioning technique using the difference between the reception timings of signals transmitted by nodes which have already been positioned. The nodes used for positioning may include a base station (BS), a relay, a fixed D2D node, a global positioning system (GPS), a mobile D2D terminal whose position is known (by a conventional positioning technique).

DISCLOSURE

Technical Problem

An aspect of the present disclosure is to provide a method and apparatus for improving the accuracy of reference signal time difference (RSTD) estimation during positioning in a wireless communication system.

Another aspect of the present disclosure is to provide a method and apparatus for determining whether paths are overlapped and how much the paths are overlapped during reference signal (RS) reception in a wireless communication system.

Another aspect of the present disclosure is to provide a method and apparatus for, upon detection of an overlap between paths, extending the transmission bandwidth of a positioning reference signal (PRS) to increase positioning accuracy in a wireless communication system.

Another aspect of the present disclosure is to provide a method and apparatus for canceling an interference component caused by a path overlap which still remains even after extension of the transmission bandwidth of a PRS in a wireless communication system.

Another aspect of the present disclosure is to provide a method and apparatus for estimating the position of a specific terminal using signal transmission and reception between device-to-device (D2D) terminals in a wireless communication system.

Another aspect of the present disclosure is to provide signal resources or radio resources for transmission and reception of signals, when the signals are transmitted and received between a D2D terminal and a serving base station (BS) and a network server in a wireless communication system.

Technical Solution

In an aspect of the present invention, a method for supporting positioning of a user equipment (UE) in a wireless communication system includes receiving a reference signal (RS) in a first bandwidth from each of a plurality of anchor nodes scheduled for RS transmission by a network server, determining whether a path overlap has occurred between the UE and the anchor nodes based on symmetry of channel impulse responses of the received RSs, transmitting a bandwidth extension request message to the network server, upon occurrence of a path overlap, receiving an RS in a second bandwidth larger than the first bandwidth from each of the plurality of anchor nodes in response to the transmission of the bandwidth extension request message, and generating information required to position the UE, using the RSs received in the second bandwidth.

In another aspect of the present invention, a method for supporting positioning of a UE by a network server in a wireless communication system includes scheduling transmission of an RS in a first bandwidth for each of a plurality of anchor nodes, if the UE receiving the RSs in the first bandwidth detects a path overlap between the UE and the anchor nodes based on symmetry of channel impulse responses of the RSs, receiving a bandwidth extension request message from the UE, and scheduling RS transmission in a second bandwidth larger than the first bandwidth for each of the plurality of anchor nodes. The RSs transmitted in the second bandwidth are used to position the UE.

MODE FOR CARRYING OUT THE INVENTION

Figure 1:
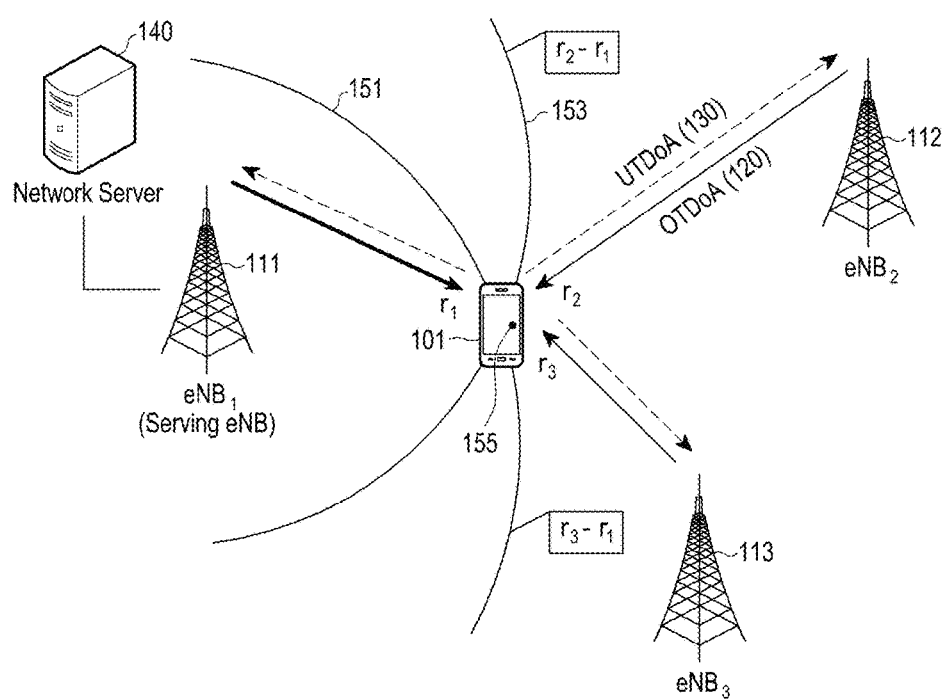
FIG. 1 is a view depicting an observed time difference of arrival (OTDoA) scheme and an uplink observed time difference of arrival (UTDoA) in a cellular long term evolution (LTE) communication system.

A detailed description of a generally known function or structure of the present disclosure will be avoided lest it should obscure the subject matter of the present disclosure. Reference will be made to embodiments of the present disclosure with reference to the attached drawings.

While embodiments of the present disclosure as set forth below are separately implemented for the convenience of description, at least two embodiments may be combined as far as they do not collide with each other.

Although the terms used in the present disclosure are defined in consideration of functions in the embodiments of the present disclosure, the terms may be changed according to the intention of a user or an operator, or customs. Therefore, the present disclosure should be understood, not simply by the actual terms used but by the meanings of each term lying within.

Various modifications can be made to the embodiments of the present disclosure, and the present disclosure can be practiced in various embodiments. However, the scope of the present disclosure is not intended to be limited to the particular embodiments and it is to be understood that the present disclosure covers various modifications, equivalents, and/or alternatives falling within the scope and spirit of the present disclosure.

The term as used in the present disclosure, 'first' or 'second' may be used to describe various components, not limiting the components. These expressions are used to distinguish one component from another component. For example, a first component may be referred to as a second component and vice versa without departing from the scope of the present disclosure. The term 'and/or' covers any of a plurality of related items or all possible combinations of the plurality of related items.

The terms as used in the present disclosure are provided to describe merely specific embodiments, not intended to limit the scope of other embodiments. It is to be understood that singular forms include plural referents unless the context clearly dictates otherwise. In the present disclosure, the term "include" or "have" signifies the presence of a specific feature, number, step, operation, component, part, or a combination thereof, not excluding the presence of one or more other features, numbers, steps, operations, components, parts, or a combination thereof.

An apparatus and method proposed by the present disclosure are applicable to various communication systems including a long term evolution (LTE) mobile communication system, an LTE-advanced (LTE-A) mobile communication system, a high-speed downlink packet access (HSDPA) mobile communication system, a high-speed uplink packet access (HSUPA) mobile communication system, a $3^{rd}$ generation partnership project 2 (3GPP2) high-rate packet data (HRPD) mobile communication system, a 3GPP2 wideband code division multiple access (WCDMA) mobile communication system, a 3GPP2 code division multiple access (CDMA) mobile communication system, an institute of electrical and electronics engineers (IEEE) 802.16m communication system, an evolved packet system (EPS), and a mobile Internet protocol (mobile IP) system.

Before a detailed description of embodiments of the present disclosure, a wireless communication-based positioning scheme under consideration in the 3GPP will first be described in brief.

In the wireless communication-based positioning scheme, reference signals (RSs) are transmitted and received between a target user equipment (UE) and at least three nodes whose positions are known, and the position of the target UE is estimated using information about the known positions of the nodes and reception times of the RSs at the nodes or the target UE. For example, an LTE system uses an observed time difference of arrival (OTDoA) for downlink (DL) or an uplink observed time difference of arrival (UTDoA) for uplink (UL) as a wireless communication-based positioning scheme, depending on whether an entity transmitting an RS is a node or a UE.

FIG. 1 is a view depicting the OTDoA scheme and the UTDoA scheme in a cellular LTE communication system.

In OTDoA 120, a UE 101 receives positioning reference signals (PRSs) from a serving evolved node B (eNB) to which the UE 101 belongs, $eNB_1$ 111, and two or more neighbor eNBs, $eNB_2$ 112 and $eNB_3$ 113. The UE 101 receives the PRSs transmitted by $eNB_2$ 112 and $eNB_3$ 113 based on a DL reception time from the serving eNB, $eNB_1$ 111, and estimates reference signal time differences (RSTDs), each being a time difference between received PRSs.

$$\hat{\tau}_2 = RSTD_{2,1} = (T_2+\tau_2)-(T_1+\tau_1) = (\tau_2-\tau_1)+(T_2-T_1)$$

$$\hat{\tau}_3 = RSTD_{3,1} = (T_3+\tau_3)-(T_1+\tau_1) = (\tau_3-\tau_1)+(T_3-T_1) \quad \text{[Equation 1]}$$

In [Equation 1], $T_1$, $T_2$, and $T_3$ represent reference transmission times of $eNB_1$ 111, $eNB_2$ 112, and $eNB_3$ 113, respectively, and $\tau_1$, $\tau_2$, and $\tau_3$ represent propagation delays based on the distances between the UE 101 and $eNB_1$ 111, $eNB_2$ 112, and $eNB_3$ 113.

As noted from [Equation 1], an RSTD estimated from a PRS transmitted by $eNB_i$ (i=1 and 2) is the sum of a time difference of arrival (TDoA), $\tau_i-\tau_1$ between a time of arrival (ToA) between the UE and $eNB_i$ and a ToA between the UE and the serving eNB, $eNB_1$ 111, and a reference time difference $T_i-T_1$ between the two eNBs.

After measuring RSTDs for the at least two neighbor eNBs, the UE transmits the measured RSTDs to a network server 140. Then, the network server 140 may derive TDoA information from the RSTDs using prior knowledge of reference time differences among the eNBs, and derive two or more hyperbolic curves 151 and 153 being a set of points whose distances to the two eNBs 112 and 113 are constant by calculating the difference between a UE-$eNB_2$ distance and a UE-$eNB_3$ distance based on the TDoAs. Subsequently, the network server 140 may estimate the position of the UE 101 by calculating the intersection 155 between the derived two or more hyperbolic curves 151 and 153.

In UTDoA 130, the serving eNB, $eNB_1$ 111 may command the UE 101 to transmit a sounding reference signal (SRS) being an RS configured for measuring a UL channel state, and the UE 101 may transmit an SRS. The neighbor eNBs, $eNB_2$ 112 and $eNB_3$ 113 receive the SRS, calculate RSTDs, and transmit the calculated RSTDs to the network server 140. Then, the network server 140 may estimate the position of the UE 101.

As described above, the UTDoA scheme 130 and the OTDoA scheme 120 are basically identical in principle, except that an entity calculating RSTDs is different, that is, an eNB or a UE.

If the above-described wireless communication-based positioning scheme is used, an RSTD calculated by a receiver is replaced with a distance between a transmitter and the receiver. Only when the estimated RSTD is a measurement of a signal propagated in a line-of-sight (LOS) path between the transmitter and the receiver, positioning may be accurate. In a general multi-path channel environment, waves reflected from a surrounding object are incident through a non-line-of-sight (NLOS) path. As a result, a signal component propagated in a LOS path and signal components propagated in NLOS paths are received with different time delays at the receiver. Since the path of a reflected wave is longer than a line path, a signal received from a first arrival path (FAP) at the receiver may be regarded as a LOS signal component, among signals received from multiple paths. In consideration of the physical phenomenon, the receiver generally estimates an RSTD based on the time delay of a FAP as an RSTD after channel impulse response (CIR) estimation, determining that the shortest of paths having power equal to or larger than a predetermined threshold to be the FAP.

If an FAP is detected based on a CIR, there are limitations in ensuring estimation accuracy due to a limited bandwidth (BW). In a CIR estimated from an RS transmitted in a restricted BW, each path is shown in the form of a sinc function in which a half width of a main lobe is the reciprocal of a BW. In view of this feature, as the BW of an RS increases, each path is closer to the form of a tone. On the contrary, as the BW of the RS decreases, each path is shown as a sinc function with a larger width. This feature results in observation of dispersion of each path component to an adjacent path area and thus a path overlap. If such a path overlap occurs, the shape of the CIR may be distorted and thus a peak value may be measured at a position other than the position of an original path. As a consequence, the receiver may detect an RSTD with an error.

Figure 2:
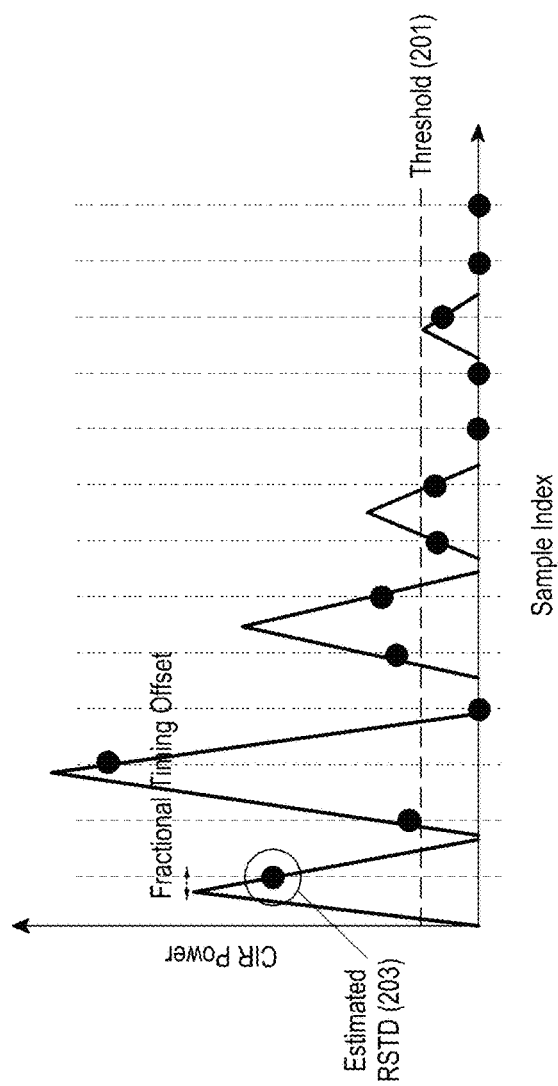
FIG. 2 is a view depicting a general method for detecting a first arrival path (FAP) and estimating a reference signal time difference (RSTD), based on a channel impulse response (CIR)

FIG. 2 is a view depicting a general method for detecting a FAP and estimating an RSTD, based on a CIR.

In FIG. 2, the X axis represents sample indexes, and the Y axis represents CIR power.

A UE may receive a PRS from an eNB, detect a CIR from the received PRS, and determine a path having the shortest of the time delays of paths having power equal to or larger than a predetermined threshold 201 to be a "FAP". The UE may then detect an RSTD 203 being an integer multiple of a sampling interval $T_s$ from the sample index of the detected FAP. However, since an RSTD being a fractional multiple of the sampling interval is not detected during the sample detection, there is a fractional timing offset (FTO) having a value in the range of $[-0.5T_s, 0.5T_s]$ between the sample index of the detected FAP and an actual RSTD.

For reference, the PRS transmitted by the eNB has a BW of 1.5 to 20 MHz according to a configuration of the eNB. Further, since the UE generally samples a received signal at a sampling rate corresponding to a system BW, if the system BW is small, the sampling rate is low, thereby decreasing estimation accuracy during RSTD estimation on a per-sample basis. In other words, if the system BW is small, the value of an FTO in the range of $[-0.5T_s, -0.5T_s]$ increases.

Now, a description will be given of two methods for solving the above-described problem of an accuracy decrease during RSTD estimation.

In one of the two methods, if a BW allocated to a current configured PRS is smaller than a maximum BW of 20 MHz, a sampling rate is increased by forcedly applying a fast Fourier transform (FFT) size larger than an FFT size corresponding to the BW of the PRS, rather than sampling is performed using the FFT size corresponding to the BW of the PRS, and a measurement resolution is increased using the increased sampling rate during RSTD measurement from the received signal. Therefore, positioning may be performed based on a more accurate RSTD. A maximum available sampling rate is a sampling rate corresponding to a system BW of 20 MHz, and the resulting sampling interval is $$T_s = 1/(15000 \times 2048) = 33 \text{ ns}$$

In the other method, a timing offset FTO being a fractional multiple of a sampling interval is applied to an early-late detection (ELD) algorithm in an orthogonal frequency division multiplexing (OFDM) system.

Figure 3:
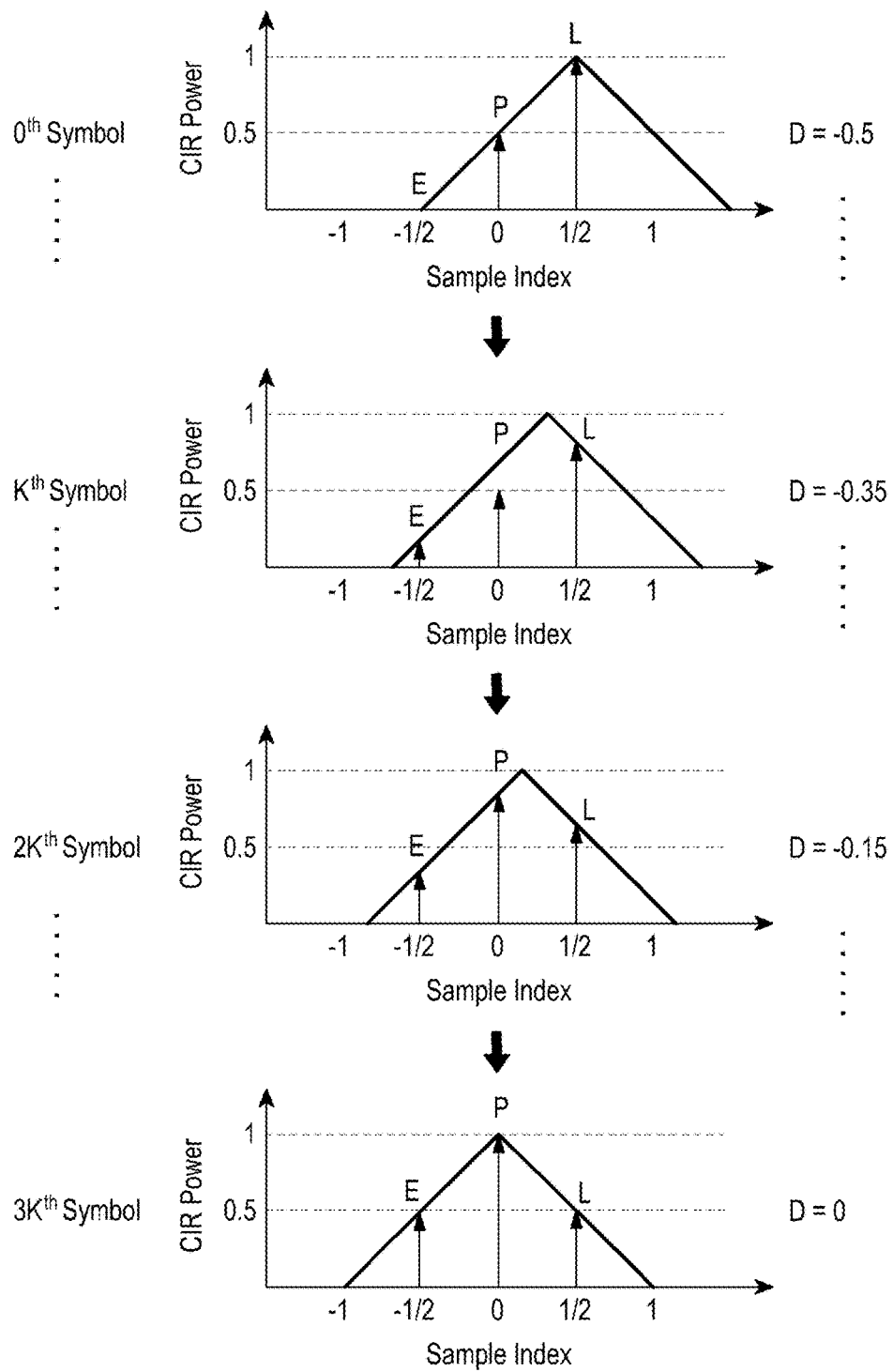
FIG. 3 is a view depicting an operation principle of an early-late detection (ELD) algorithm.

FIG. 3 is a view depicting the operation principle of an ELD algorithm.

The ELD algorithm estimates a channel frequency response (CFR) H(k) using pilot subcarriers in the frequency domain as in a general OFDM system, generates new CFRs $H_E(k)$ and $H_L(k)$ by performing linear phase rotations on the CFR by $0.5T_s$ and $-0.5T_s$, and then acquires CIRs, $h_E[n]$ and $h_L[n]$, advanced/delayed by $\pm 0.5T_s$ by inverse fast Fourier transform (IFFT)-processing the new CFRs $H_E(k)$ and $H_L(k)$. This process is expressed as [Equation 2] and [Equation 3].

$$H_E(k)=H(k)\cdot\exp(j2\pi k(-0.5)/N), h_E[n]=\text{IFFT}\{H_E(k)\}=h[n-0.5] \quad \text{[Equation 2]}$$

$$H_L(k)=H(k)\cdot\exp(j2\pi k(+0.5)/N), h_L[n]=\text{IFFT}\{H_L(k)\}=h[n+0.5] \quad \text{[Equation 3]}$$

When a CIR is measured using a finite BW, the path of a signal corresponding to the CIR is represented as a sinc function with the width of a main lobe of the CIR being 2/BW, and as illustrated in FIG. 3, the sinc function is symmetrical sideways with respect to a peak point. If a current sampling point accurately matches a peak point of the CIR path, the FAP power of the calculated CIRs advanced/delayed by $\pm 0.5\ T_s$ ($P_E=|h_E[0]|^2$, $P_L=|h_L[0]|^2$) is equal. However, if an FTO occurs and thus the peak point is shifted in one direction from the current sampling point, $P_E$ and $P_L$ have different values and a value near to the peak point has higher power. The ELD algorithm calculates an FTO metric D using this property by [Equation 4].

$$D = \frac{P_E - P_L}{2(P_E + P_L)} \quad \text{[Equation 4]}$$

Although the FTO estimate calculated by [Equation 4] has an estimation error due to noise, the error of the FTO estimate may generally be corrected by tracking based on a loop filter used in a wireless communication system. That is, a new CFR with a corrected FTO is generated by correcting the FTO estimate by 0.01 to 0.1 of the estimate D, by [Equation 5].

$$H_c(k)=H(k)\cdot\exp(j2\pi k(-0.1D)/N) \quad \text{[Equation 5]}$$

As described above, the current sampling point may be shifted to the peak point of the CIR path by repeating FTO estimation and partial FTO correction as described above, and the distance from an initial sampling point to a final converged sampling point becomes a final FTO estimate. Herein, an RSTD estimate at the receiver is the sum of a time delay of an integer multiple of a sampling interval obtained from the sample index of the FAP, and the estimated FTO.

If an RSTD is estimated by applying the foregoing conventional two methods, an estimation error occurs in view of a path overlap in an NLOS environment. Considering the characteristics of a CIR taking the form of a sinc function, if a second path delay between an FAP and a second arrival path (SAP) is equal to or smaller than 2/BW in the NLOS channel environment having multiple paths, a path overlap occurs between the main lobes of the FAP and the SAP. If a path overlap occurs, the shape of a CIR is changed irregularly due to destructive/constructive interference between paths and thus a peak value may be observed at a position other than the position of an original path. Due to this phenomenon, the receiver may have an error in RSTD detection.

Meanwhile, if a signal BW increases, the width of the main lobe of a path, as defined as 2/BW, becomes small, thereby overcoming a path overlap. That is, a wide BW is required to increase an RSTD estimation accuracy in the NLOS environment. [Table 1] below lists BWs required to avoid an overlap between a main lobe and a first side lobe in main multi-path channel models.

TABLE 1

|  |  | Main-Lobe | First Side-Lobe |
| --- | --- | --- | --- |
| ITU Ped.-A | 110 ns | 18.18 MHz | 54.55 MHz |
| ITU Ped.-B | 200 ns | 10 MHz | 30 MHz |
| ITU Veh.-A | 310 ns | 6.45 MHz | 19.35 MHz |
| ITU Veh.-B | 300 ns | 6.67 MHz | 20 MHz |
| COST 207 TU | 200 ns | 10 MHz | 30 MHz |
| 3GPP EPA | 30 ns | 66.67 MHz | 200 MHz |
| 3GPP EVA | 30 ns | 66.67 MHz | 200 MHz |
| 3GPP ETU | 50 ns | 40 MHz | 120 MHz |

Referring to [Table 1], if an overlap between main lobes is targeted, a BW of up to 66.7 MHz is required, and if an overlap between up to first side lobes is targeted, a BW of up to 200 MHz is required. However, since a multi-path time delay varies according to deployment of a reflective obstacle in a path between a transmitter and a receiver, an actual BW that a UE requires to estimate an accurate RSTD varies greatly according to a channel state in which the UE is placed. Consequently, a wide BW is required to increase the accuracy of RSTD estimation.

The present disclosure provides a method and apparatus for increasing the accuracy of RSTD estimation during positioning in a wireless communication system.

The present disclosure provides a method and apparatus for determining whether a path overlap has occurred and measuring the degree of the path overlap during RS reception in a wireless communication system.

The present disclosure provides a method and apparatus for, upon detection of a path overlap, extending a PRS transmission BW in order to increase the accuracy of positioning in a wireless communication system.

The present disclosure provides a method and apparatus for canceling an interference component caused by a path overlap which still remains even after extension of the transmission BW of a PRS in a wireless communication system.

The following description is given of a positioning procedure based on a D2D communication technology defined in a 3GPP LTE Rel-12 and beyond system, proximity service (ProSe). However, the present disclosure is not limited to ProSe. Rather, the present disclosure may be applied to an eNB-based positioning scheme in a 3GPP LTE system or may use both an eNB and a D2D node. Besides the LTE system, the present disclosure is obviously applicable to other systems including Bluetooth (BT), wireless fidelity (WiFi), GPS, and so on.

First, the basic concept of a method for positioning a UE in a wireless communication system according to an embodiment of the present disclosure will be described in brief.

In the present disclosure, positioning is performed through D2D communication in the positioning schemes based on the legacy cellular communication system, OTDoA and UTDoA. That is, RSTDs are calculated through communication between a UE and a serving eNB and neighbor eNBs in the legacy OTDoA and UTDoA schemes, as described before with reference to FIG. 1.

In the present disclosure, the UE calculates RSTDs by communicating with D2D UEs neighboring to the UE, instead of eNBs. Specifically, a method for estimating a position based on a DL scheme, OTDoA is performed as follows. First of all, the UE may receive "D2D PRSs"

(hereinafter, referred to shortly as "PRSs") in a BW set to an initial value from other D2D UEs. As proposed in the present disclosure, the UE determine whether a path overlap has occurred, and if the path overlap has occurred and the BW of the PRSs is not a maximum BW allowed in the system, the UE may request a network server or the like to allow BW extension. The network server or the like may schedule transmission of PRSs in an extended BW for the D2D UEs, and the D2D UEs may transmit PRSs again in the extended BW. Then, the UE may receive the PRSs in the extended BW and determine again whether a path overlap has occurred. If no path overlap has occurred, the UE may calculate RSTDs and upload the RSTDs to the network server. The network server may estimate the position of the UE based on the uploaded RSTDs. If a path overlap has occurred despite the reception of the PRSs in the extended BW and the extended BW is the system-allowed maximum BW, the UE may not request BW extension any more. Therefore, if a path overlap occurs despite reception of PRSs in an extended BW, an operation for eliminating the remaining path overlap may additionally be performed before RSTD estimation. A path overlap elimination method will be described later.

The above description is about a major example of D2D positioning based on OTDoA as proposed by the present disclosure. Besides the above-described example, many other embodiments of the present disclosure may be implemented. Hereinbelow, various embodiments of the present disclosure will be described.

In the description of embodiments of the present disclosure, an "anchor node" may be a fixed D2D UE pre-installed at a specific position by a network operator. In this case, position information about each anchor node is preset and thus may be known to the anchor node, neighboring anchor nodes, a network server, and so on. The anchor node may also be a mobile D2D UE whose position is detected preliminarily by a legacy positioning technology such as GPS. In this case, position information about the anchor node may also be known to the anchor node and the network server.

In the present disclosure, the UE estimates RSTDs by communicating with a plurality of anchor nodes. That is, the UE may receive PRSs from the plurality of anchor nodes or transmit a PRS to the plurality of anchor nodes. For the convenience of description, unless the term "anchor node" clearly refers to a single anchor node, it may mean "a plurality of anchor nodes".

Meanwhile, since the network server is connected to a serving eNB, the network sever communicates with a UE or anchor nodes via the serving eNB. Therefore, even though it is not clarified that communication between a network node and a UE or anchor nodes is via a serving eNB, the communication is performed via the serving eNB.

Figure 4:
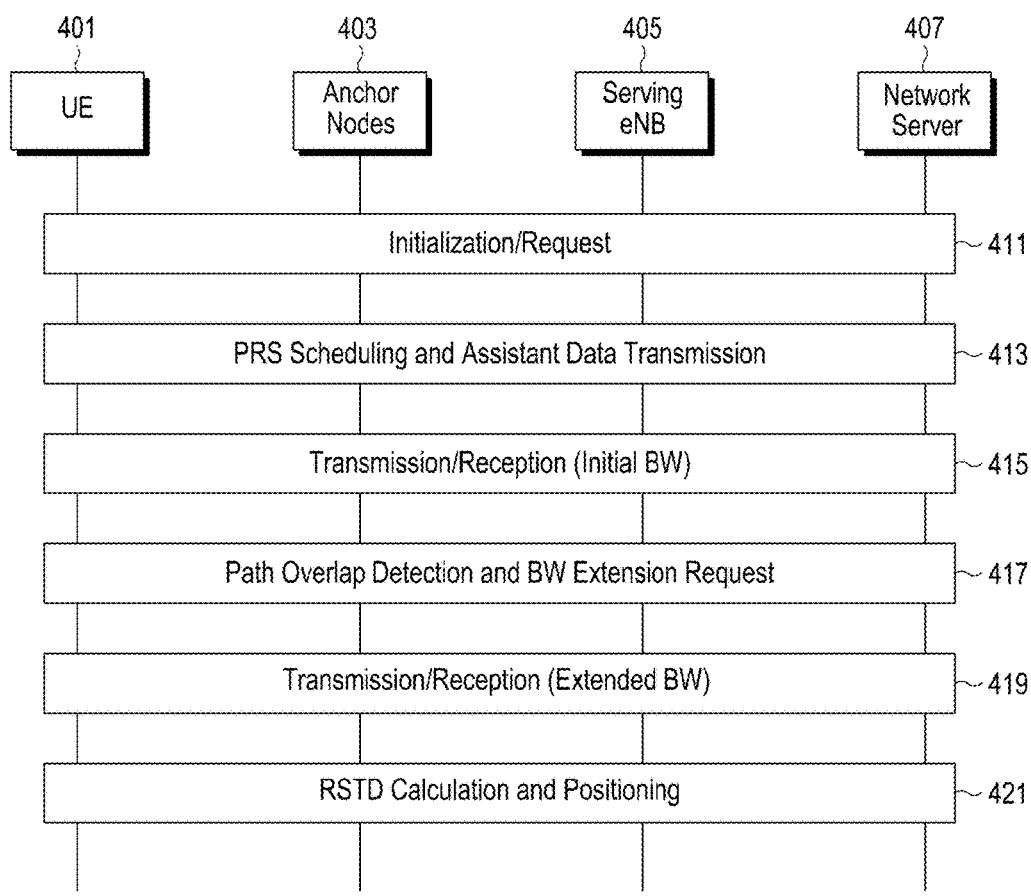
FIG. 4 is a diagram illustrating a signal flow for an overall operation for performing a device-to-device (D2D)-based positioning method according to an embodiment of the present disclosure.

FIG. 4 is a diagram illustrating a signal flow for an overall operation for performing a D2D-based positioning method according to an embodiment of the present disclosure.

Referring to FIG. 4, operation 411 is an initialization and request operation in which a UE 401 or a network server 407 requests positioning. Also, the network server 407 exchanges information so as to detect anchor nodes around the UE 401 to use the anchor nodes in positioning. The initialization and request operation may be performed in various embodiments depending on whether it is based on OTDoA or UTDoA. These various embodiments will be described in detail with reference to FIG. 5.

In operation 413, PRS scheduling is performed and assistant data is transmitted and received. Specifically, PRS transmission for positioning is scheduled and assistant data required for PRS reception is transmitted to a PRS receiver. An initial transmission BW of a PRS is fixed, which is predefined or configured by the network server 407.

Operation 413 may be realized in OTDoA or UTDoA depending on whether a PRS transmitting entity is anchor nodes 403 or the UE 401. Further, operation 413 may be performed differently depending on whether the type of a signal used as a PRS is demodulation reference signal (DM-RS) for demodulation of a physical sidelink shared channel (PSSCH) or SRS.

In addition, operation 413 may be performed differently according to the type and transmission scheme of the assistant data. The assistant data transmitted to the UE 401 receiving a PRS may be classified as essential assistant data mandatory for PRS reception or optional assistant data needed for the UE 401 to directly estimate its position although it is not needed for PRS reception. The assistant data may be delivered by the network server 407 or directly by the PRS transmitting entity. The afore-described options will be described in detail with reference to FIGS. 6a and 6b.

Operation 415 is an operation of transmitting a PRS by an entity for which PRS transmission has been scheduled in operation 413. In operation 415, the PRS transmitting entity and the PRS receiving entity may be the anchor nodes 403 neighboring to the UE 401 and the UE 401, respectively, or vice versa. Since a PRS is scheduled to have the initial BW in operation 413, the BW of the PRS transmitted in operation 415 is the initial BW.

In operation 417, the entity which has received the PRS in operation 415 determines whether a path overlap has occurred due to multiple paths and how much paths are overlapped, and requests retransmission of a PRS having an extended BW according to the determination result. Scheduling for PRS retransmission is performed and related assistant data is transmitted and received, according to the request. A specific operation of the UE 401 for detecting a path overlap will be described later. If no path overlap has been detected, RSTDs may be detected in operation 421. On the other hand, upon detection of a path overlap, the PRS receiving entity requests BW extension to the PRS transmitting entity to overcome the detected path overlap.

In operation 419, PRS transmission and reception are performed in the PRS BW extended in operation 417. Operation 419 is identical to operation 415 except that the transmission BW is extended.

In operation 421, the UE 401 calculates RSTDs and/or estimates its position using the received PRSs. Meanwhile, when calculating the RSTDs, the UE 401 may increase an estimation accuracy by selectively applying an iterative path overlap removal algorithm. The iterative path overlap removal scheme will be described later in detail. After estimating the RSTDs, the UE 401 may perform positioning directly in an option used in operation 413 from among the options, or may upload the RSTDs to the network server 407 so that the network server 407 may position the UE 401.

While not shown, each entity may include components configured to execute functions described in embodiments of the present disclosure. For example, the network server 407 may include a transceiver for transmitting and receiving signals to and from an external entity, a scheduler for scheduling PRS transmission, and a controller for providing overall control. The serving eNB 405 may also include a transceiver, a controller, and so on.

Figure 5A:
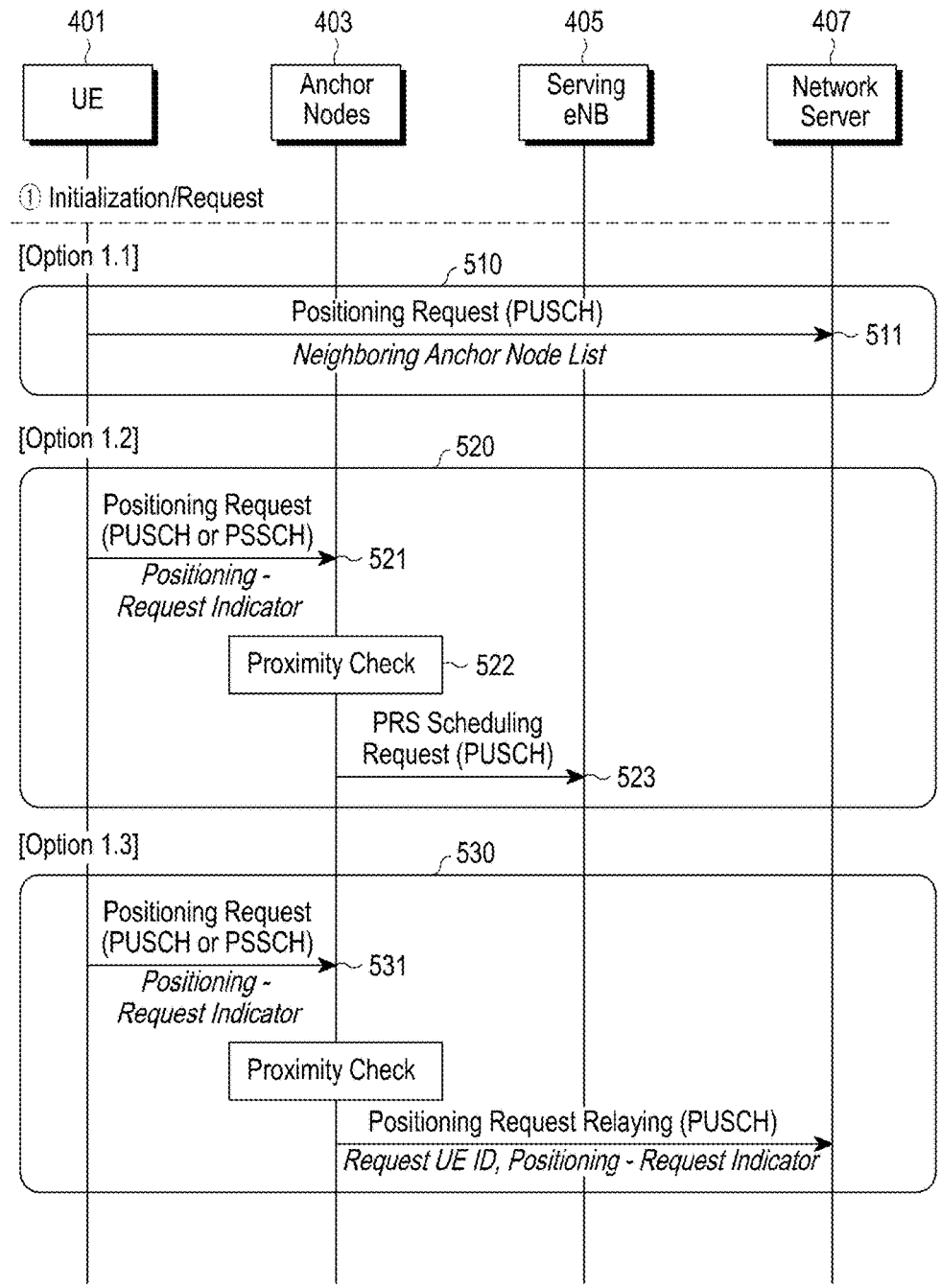
FIGS. 5a and 5b are diagrams illustrating signal flows for available options for an initialization/request procedure in operation 411 of FIG. 4.
Figure 5B:
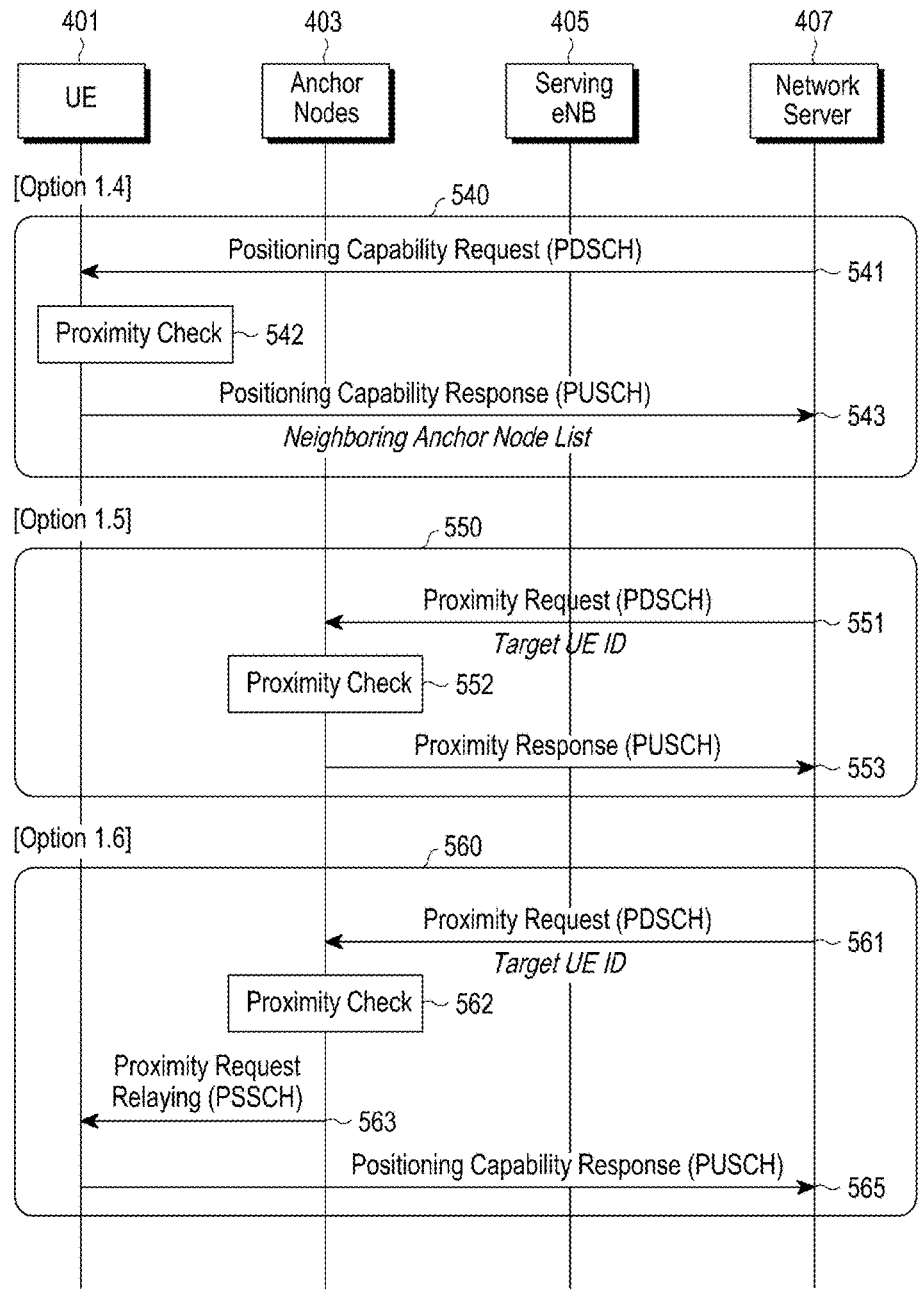

FIGS. 5a and 5b are diagrams illustrating signal flows for available options for the initialization/request procedure in operation 411 of FIG. 4.

In FIGS. 5a and 5b, six options are shown. For the convenience of description, the six options are denoted by <Option 1.1> 510 to <Option 1.6> 560.

<Option 1.1> 510, <Option 1.2> 520, and <Option 1.3> 530 are based on OTDoA, in which the UE 401 requests a Positioning Request message.

In <Option 1.1> 510, the UE 401 transmits a Positioning Request message directly to the network server 407 in operation 511. This operation may be performed by modifying an application level protocol, LTE positioning protocol (LPP), defined to request positioning to the network server 407 during legacy eNB-based positioning. In this case, the UE 401 transmits the Positioning Request message on a physical uplink shared channel (PUSCH). Meanwhile, the Positioning Request message includes information about Identifications (IDs) of the anchor nodes 403 neighboring to the UE 401.

However, to perform the D2D-based positioning procedure, each UE 401 should be able to determine whether there is any neighboring anchor node 403 and get ID information about each anchor node 403. This operation may be performed by D2D UE discovery in the UE 401. For example, the anchor nodes 403 may notify the UE 401 of their existence by transmitting information (for example, an application ID or flag bits) indicating that the anchor nodes 403 are nodes supporting positioning in a discovery message configured for discovering their D2D UEs.

Referring to FIG. 5a again, upon receipt of the Positioning Request message, the network server 407 may be aware of what anchor nodes 403 are around the UE 401. To ensure a sufficient positioning accuracy, the anchor nodes 403 and the UE 401 should be near enough to have high signal to noise ratios (SNRs) and high LoS probabilities. For this purpose, anchor nodes 403 supporting positioning of the UE 401 may be selected in the following manner.

(1) The UE 401 may upload a list of all anchor nodes 403 that the UE 401 has succeeded in discovering to the network server 407, and the network server 407 may select anchor nodes 403. The UE 401 may also upload the reference signal received power (RSRP) of a discovery signal received from each anchor node 403 to the network server 407, and the network server 407 may select some anchor nodes 403 near to the UE 401 based on the RSRPs.

(2) The UE 401 may upload a list of all anchor nodes 403 that the UE 401 has succeeded in discovering to the network server 407, and the network server 407 may select anchor nodes 403. Considering that positioning performance may vary according to the geometric deployment of each anchor node 403, the network server 407 may select the anchor nodes 403, taking into account the deployment of the anchor nodes 403.

(3) The UE 401 may upload a list of all anchor nodes 403 that the UE 401 has succeeded in discovering to the network server 407, and the network server 407 may select anchor nodes 403. The UE 401 may also upload the RSRP of a discovery signal received from each anchor node 403 to the network server 407, and the network server 407 may select some anchor nodes 403 in consideration of both the RSRPs and the deployment of the anchor nodes 403.

(4) The UE 401 may select anchor nodes 403 having the received powers of discovery signals equal to or higher than a predetermined level from among a plurality of neighboring anchor nodes 403, and indicate only the IDs of the selected anchor nodes 403 to the network server 407.

In <Option 1.2> 520, the UE 401 requests positioning to the neighboring anchor nodes 403 in operation 521. When transmitting a discovery message on a PSDCH configured for the purpose of discovering D2D UEs 401, the UE 401 may transmit information (for example, an application ID or flag bits) requesting positioning in a Positioning Request message or a message on a PSSCH configured for the purpose of D2D communication.

Meanwhile, upon receipt of the Positioning Request message from the UE 401, the anchor nodes 403 request PRS scheduling to the eNB 405 in operation 523. Similarly to the afore-described <Option 1.1>, it may be regulated that if the received power of the PSDCH or PSSCH signal transmitted by the UE 401 is equal to or higher than a predetermined level in operation 522, the anchor nodes 403 request PRS scheduling. Alternatively or additionally, it may be regulated that it is determined whether a path overlap has occurred, and if a path overlap has not occurred, the anchor nodes 403 request PRS scheduling.

Meanwhile, anchor nodes 403 supporting positioning of the UE 401 may be selected in the following manner.

(1) Upon receipt of a PSDCH or PSSCH signal from the UE 401, D2D nodes request PRS scheduling to the eNB 405 and transmit the RSRPs of the signal received from the UE 401 to the eNB 405. The eNB 405 selects a part of the D2D nodes as anchor nodes 403 supporting positioning of the UE 401 in consideration of the received RSRPs, and schedules PRS transmission for the anchor nodes 403.

(2) D2D nodes which has received the PSDCH or PSSCH signal with power equal to or higher than a predetermined level from the UE 401 become nodes supporting positioning, that is, the anchor nodes 403 and request PRS scheduling to the eNB 405.

Likewise in <Option 1.2>, the UE 401 requests positioning to the neighboring anchor nodes 403, and the anchor nodes 403 notify the network server 407 of the existence of the UE 401 requesting positioning and ID information about the UE 401 in <Option 1.3> 530.

Anchor nodes 403 supporting positioning of the UE 401 may be selected in the following manner.

(1) Upon receipt of a PSDCH or PSSCH signal with power equal to or higher than a predetermined level from the UE 401, all D2D nodes respond to the network server 407 and the network server 407 selects a part of the D2D nodes as anchor nodes 403 supporting positioning of the UE 401. Each anchor node 403 may also transmit the RSRP of a discovery signal or a D2D communication signal transmitted by the UE 401 to the network server 407 so that the network server 407 may select the anchor nodes 403 based on the RSRPs.

(2) Upon receipt of a PSDCH or PSSCH signal with power equal to or higher than a predetermined level from the UE 401, all D2D nodes respond to the network server 407 and the network server 407 selects a part of the D2D nodes as anchor nodes 403 supporting positioning of the UE 401. Considering that positioning performance may vary according to the geometrical deployment of each anchor node 403, the network server 407 may select the anchor nodes 403 according to the deployment of the D2D nodes.

(3) Upon receipt of a PSDCH or PSSCH signal with power equal to or higher than a predetermined level from the UE 401, all D2D nodes respond to the network server 407 and the network server 407 selects a part of the D2D nodes as anchor nodes 403 supporting positioning of the UE 401. Each anchor node 403 may also upload the RSRP of a discovery signal or a D2D communication signal transmitted by the UE 401 to the network server 407 so that the network server 407 may select the anchor nodes 403 in consideration of both the RSRP and geometrical deployment of each D2D node.

<Option 1.4> 540, <Option 1.5> 550, and <Option 1.6> 560 as described below are methods for transmitting a Positioning Request message by the network server 407 in UTDoA.

In <Option 1.4> 540, if the network server 407 is to position the specific UE 401, the network server 407 may transmit to the UE 401 a Positioning Capability Request message asking whether positioning of the UE 401 is possible in operation 541. In this case, however, the UE 401 should be in RRC_CONNECTED state. Upon receipt of the Positioning Capability Request message, the UE 401 may determine whether D2D-based positioning is possible and reply to the network server 407 according to the determination. If there are three or more anchor nodes 403 around the UE 401 and thus D2D-based positioning of the UE 401 is possible, the UE 401 transmits a Positioning Capability Response message including ID information about the neighboring anchor nodes 403 to the network server 407 in operation 543. For reference, the foregoing operation may be performed by modifying the LPP defined in the legacy LTE system.

The anchor nodes 403 supporting positioning of the UE 401 may be selected in the same manner as in <Option 1.1>.

In <Option 1.5> 550, if the network server 407 is to position the specific UE 401, the network server 407 may request a response to the anchor nodes 403 expected to be around the UE 401 by transmitting a Proximity Request message including the ID information about the UE 401 to the anchor nodes 403 in operation 551. Meanwhile, the network server 407 may transmit the Proximity Request message to all anchor nodes 403 in a specific region/country. If the serving eNB 405 of the UE 401 is known to the network server 407, the network server 407 may transmit the Proximity Request message only to the anchor nodes 403 within the coverage of the serving eNB 405, or only to the anchor nodes 403 within the coverage of the serving eNB 405 and its neighboring eNB. Upon receipt of the response request from the network server 407, the anchor nodes 403 identify the UE 401 around them by discovering the UE 401 in operation 552. If the anchor nodes 403 detect the UE 401 requested by the network server 407, the anchor nodes 403 may transmit Proximity Response messages including information indicating discovery of the UE 401 to the network server in operation 553.

Meanwhile, the anchor nodes 403 supporting positioning of the UE 401 may be selected in the same manner as in <Option 1.3> 530.

In <Option 1.6> 560, the network server 407 requests the anchor nodes 403 to determine whether the specific UE 401 is around them by transmitting a Proximity Request message to the anchor nodes 403 in the same manner as in <Option 1.5> 550 in operation 561. The anchor nodes 403 perform discovery on the UE 401 in operation 562. Upon discovery of the specific UE 401, the anchor nodes 403 may notify the UE 401 of the positioning request of the network server 407 by forwarding the Proximity Request message in operation 563. Compared to <Option 1.4>, since the UE 401 receives the Proximity Request messages from the anchor nodes 403 instead of the network server 407, this operation is possible even in RRC IDLE state of the UE 401. Upon receipt of the Proximity Request messages, the UE 401 transmits a Positioning Capability Response message including the ID information about the neighboring anchor nodes 403 to the network server 407 in operation 565.

Meanwhile, the anchor nodes 403 supporting positioning of the UE 401 may be selected in the same manner as in <Option 1.1>.

Figure 6A:
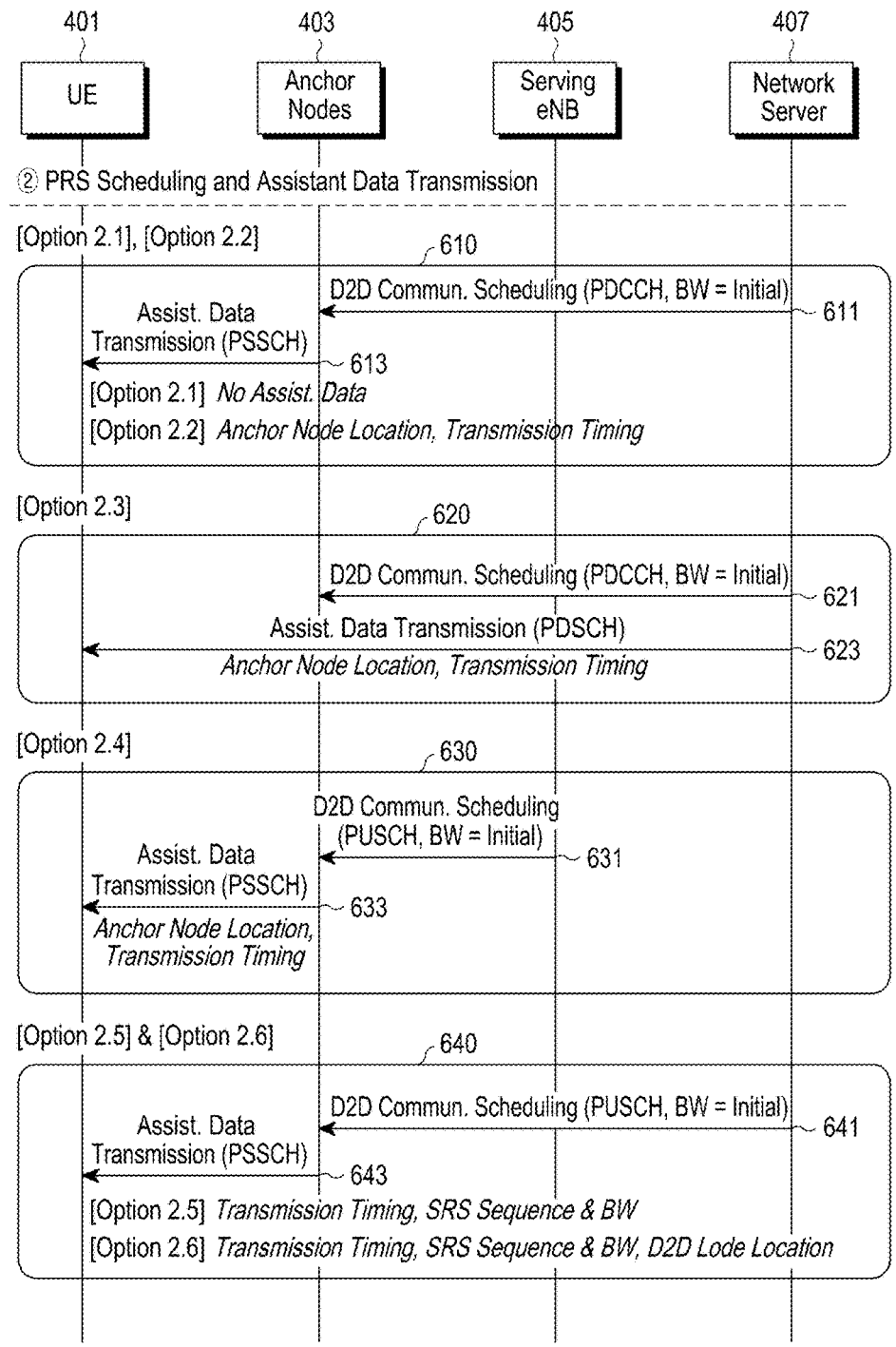
FIGS. 6a and 6b are diagrams illustrating signal flows for available options for a positioning reference signal (PRS) scheduling and assistant data transmission and reception procedure in operation 413 of FIG. 4.
Figure 6B:
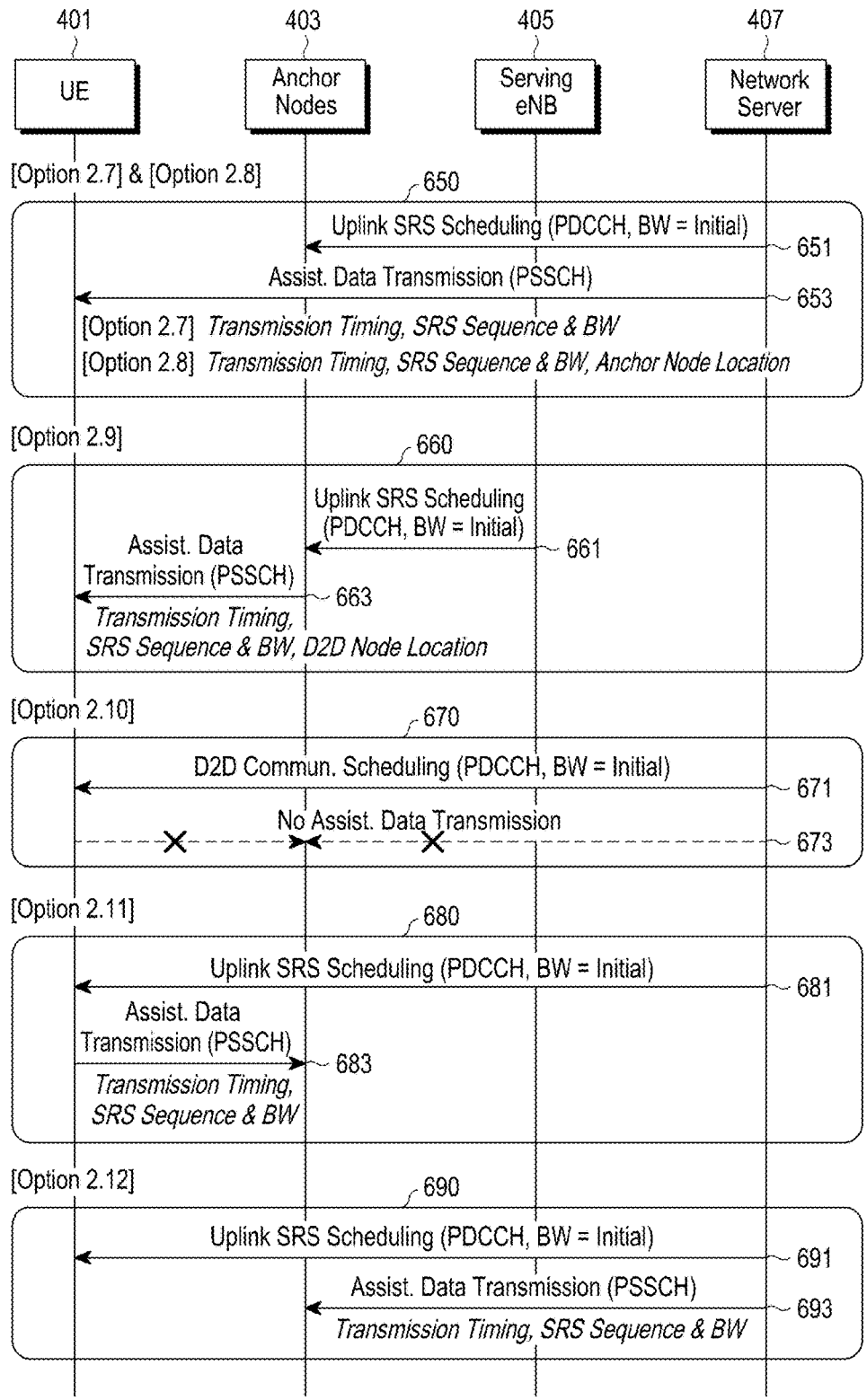

FIGS. 6a and 6b are views illustrating available options for PRS scheduling and transmission and reception of assistant data in operation 413 of FIG. 4.

Specifically, FIGS. 6a and 6b illustrate signal exchange procedures, channels carrying signals, and the types of transmitted messages in both cases of OTDoA-based positioning and UTDoA-based positioning. According to various implementation schemes, 12 options are illustrated, denoted by <Option 2.1> to <Option 2.12>, for the convenience of description.

For the convenience, <Option 2.1> and <Option 2.2> are denoted commonly by reference numeral 610. In this case, the network server 407 schedules D2D communication signal transmission for each anchor node 403 in order to perform OTDoA-based positioning in operation 611. Subsequently, the anchor nodes 403 may not provide assistant data to the UE 401 in <Option 2.1> or may transmit assistant data to the UE 401 in <Option 2.2> in operation 613. "No Assist. Data" indicates transmission of no assistant data in operation 613 in <Option 2.1>.

The reason for not providing assistant data to the UE 401 by the anchor nodes 403 in <Option 2.1> is that essential assistant data required to receive a PSSCH from each anchor node 403 is already provided on a PSCCH in the 3GPP LTE Rel-12 standard. Meanwhile, the UE 401 uploads estimated RSTD information to the network server 407 because it is not capable of autonomously estimating its position. Then, the network server 407, which has position information about each anchor node 403, may estimate the position of the UE 401.

As described above, <Option 2.2> is a case in which the anchor nodes 403 transmit assistant data to the UE 401. That is, each anchor node 403 constructs "optional assistant data" with position information and transmission time information about the anchor node 403, and transmits the optional assistant data to the UE 401. The UE 401 may determine its position based on the optional assistant data. For reference, the optional assistant data may be transmitted in a PSSCH signal.

In <Option 2.3> 620, the network server 407 schedules D2D communication signal transmission for each anchor node 403, for OTDoA-based positioning in operation 621, as in <Option 2.1> and <Option 2.2>. Subsequently, the network server 407 constructs "optional assistant data" with position information and transmission time information about the anchor nodes 403, and transmits the optional assistant data to the UE 401. The UE 401 may autonomously determine its position based on the optional assistant data. For reference, the optional assistant data may be transmitted in a PDSCH signal. <Option 2.3> 620 is different from <Option 2.2> in that the entity transmitting optional assistant data is the network server 407 in the former and the anchor nodes 403 in the latter.

As described in <Option 2.2>, since the UE 401 is not capable of autonomously estimating its position, the UE 401 uploads estimated RSTD information to the network server 407. Then, the network server 407, which has position information about each anchor node 403, may estimate the position of the UE 401.

Like <Option 1.2> 320 of FIG. 3, <Option 2.4> 630 is based on the assumption that the network server 407 is not involved in positioning. In this case, the serving eNB 405 may command PRS transmission by scheduling D2D communication signal transmission for each anchor node 403 in operation 631. Herein, optional assistant information including position information and transmission time information about the anchor nodes 403 should be transmitted to the UE 401, for use in positioning of the UE 401. However, since the serving eNB 405 has no knowledge of the position information and transmission time information about the anchor nodes 403, each anchor node 403 transmits the optional assistant data to the UE in operation 633.

<Option 2.5> and <Option 2.6> are denoted commonly by reference numeral 640, and <Option 2.7> and <Option 2.8> are denoted commonly by reference numeral 650.

In <Option 2.5>, <Option 2.6>, <Option 2.7>, and <Option 2.8>, the network server 407 schedules SRS signal transmission for each anchor node 403 to perform OTDoA-based positioning in operations 641 and 651. To receive SRS signals, the UE 401 needs assistant data. Transmission time information, time/frequency position information, and SRS sequence index information about an SRS signal (required to determine the position of an FFT window) are essential assistant data. Further, position information and transmission time information about the anchor nodes 403 required for the UE 401 to estimate its position directly may be optional assistant data. Reference numeral 643 denotes a case in which the anchor nodes 403 transmit assistant data to the UE 401, and reference numeral 653 denotes a case in which the network server 407 transmits assistant data to the UE 401. This operation will be described below in detail.

That is, the anchor nodes 403 may configure the essential assistant data and directly transmit the configured essential assistant data to the UE 401 (Option 2.5), or configure the essential assistant data and the optional assistant data together and directly transmit the configured essential and optional assistant data to the UE 401 (Option 2.6). Further, the network server 407 may transmit the essential assistant data to the UE 401 (Option 2.7) or both the essential assistant data and the optional assistant data to the UE 401 (Option 2.8).

Meanwhile, an SRS signal is originally used to measure a channel state. If such an SRS is used as a PRS, the serving eNB 405 should distinguish an SRS transmitted to measure a UL channel state from an SRS serving as a PRS. If the anchor nodes 403 transmit SRSs, the serving eNB 405 which has scheduled the SRSs as PRSs for the anchor nodes 403 is already aware that the SRSs are transmitted to support positioning. Therefore, if the serving eNB 405 does not measure a UL channel state in response to the reception of the SRSs supporting positioning, the serving eNB 405 may avoid an unnecessary operation regarding the transmission of the SRSs supporting positioning.

In <Option 2.9> 660, the serving eNB 405 commands PRS transmission by scheduling UL SRS signal transmission for each anchor node 403 on the assumption that the network server 407 is not involved in positioning as in <Option 1.2> 320 of FIG. 3 in operation 661. In this case, to allow the UE 401 to directly perform positioning, essential assistant data and optional assistant data as described in <Option 2.5> to <Option 2.8> should be transmitted to the UE 401. The anchor nodes 403 transmit D2D communication messages including the assistant data to the UE 401 in operation 663.

In <Option 2.10> 670, the network server 407 schedules D2D communication signal transmission for the UE 401, for UTDoA-based positioning in operation 671. In this case, since essential assistant data required to receive a PSSCH from the UE 401 has already been provided on a PSCCH, assistant data is not provided separately to the anchor nodes 403 (Option 2.10). Meanwhile, in the case of UTDoA-based positioning, a positioning operation may be performed only when RSTD information calculated by each anchor node 403 is collected. Thus, each anchor node 403 uploads RSTD information to the network server 407. That is, because the anchor nodes 403 are not capable of estimating the position of the UE 401 autonomously irrespective of whether optional assistant data is provided or not in view of the nature of UTDoA-based positioning, the optional assistant data is not provided. Non-transmission of the optional assistant data to the UE 401 is indicated by reference numeral 673.

In <Option 2.11> 680 and <Option 2.12> 690, the network server 407 schedules SRS signal transmission for the UE 401, for UTDoA-based positioning in operations 681 and 691. In this case, to allow the neighboring anchor nodes 403 around the UE 401 to receive an SRS signal from the UE 401, information about a rough transmission time and time/frequency position of the SRS signal, and information about the index of an SRS sequence should be configured as essential assistant data and transmitted to the anchor nodes 403.

Therefore, the UE 401 may configure a specific message in a PSSCH signal with the essential assistant data, and directly transmit the specific message to the anchor nodes 403 in operation 683. Alternatively or additionally, the network server 407 may transmit the essential assistant data on a PDSCH to the anchor nodes 403 in operation 693. Meanwhile, as in <Option 2.8>, optional assistant data is not provided to the anchor nodes 403 in UTDoA-based positioning.

Figure 7A:
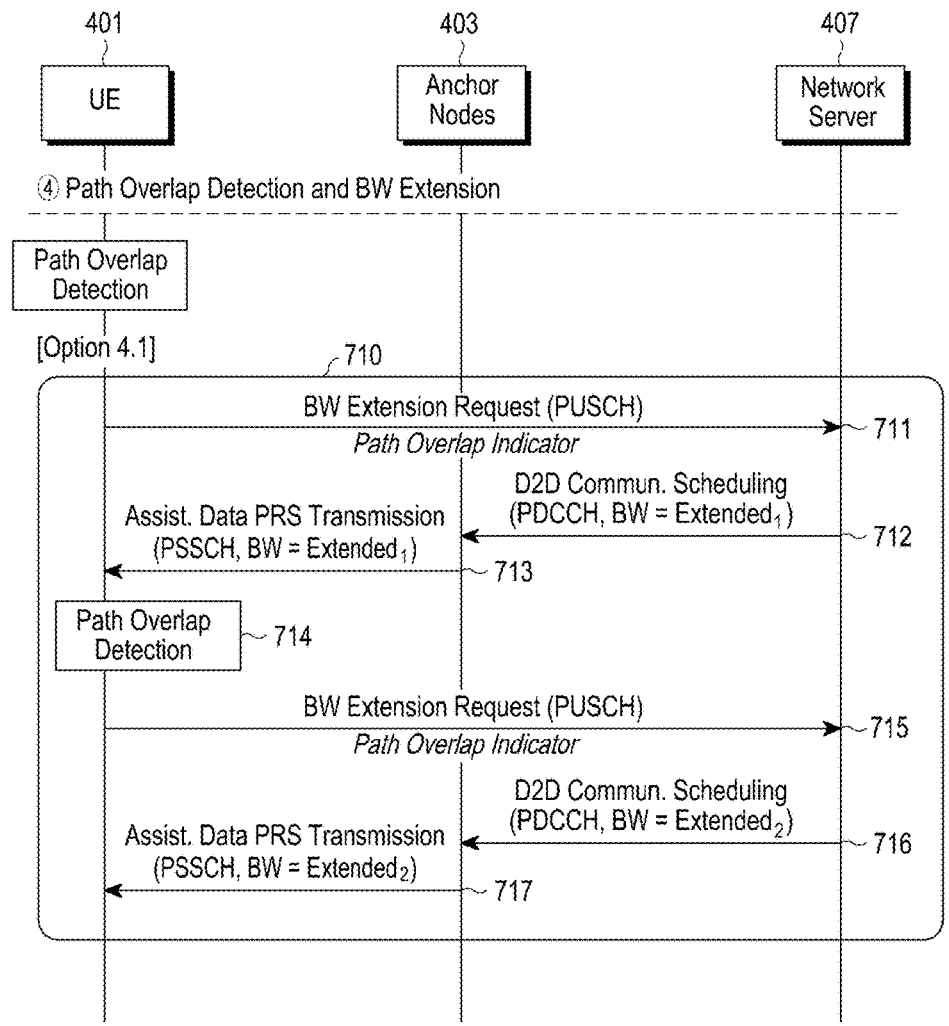
FIGS. 7a and 7b are diagrams illustrating signal flows for available options for a path overlap detection and bandwidth (BW) extension requesting procedure in operation 417 of FIG. 4.
Figure 7B:
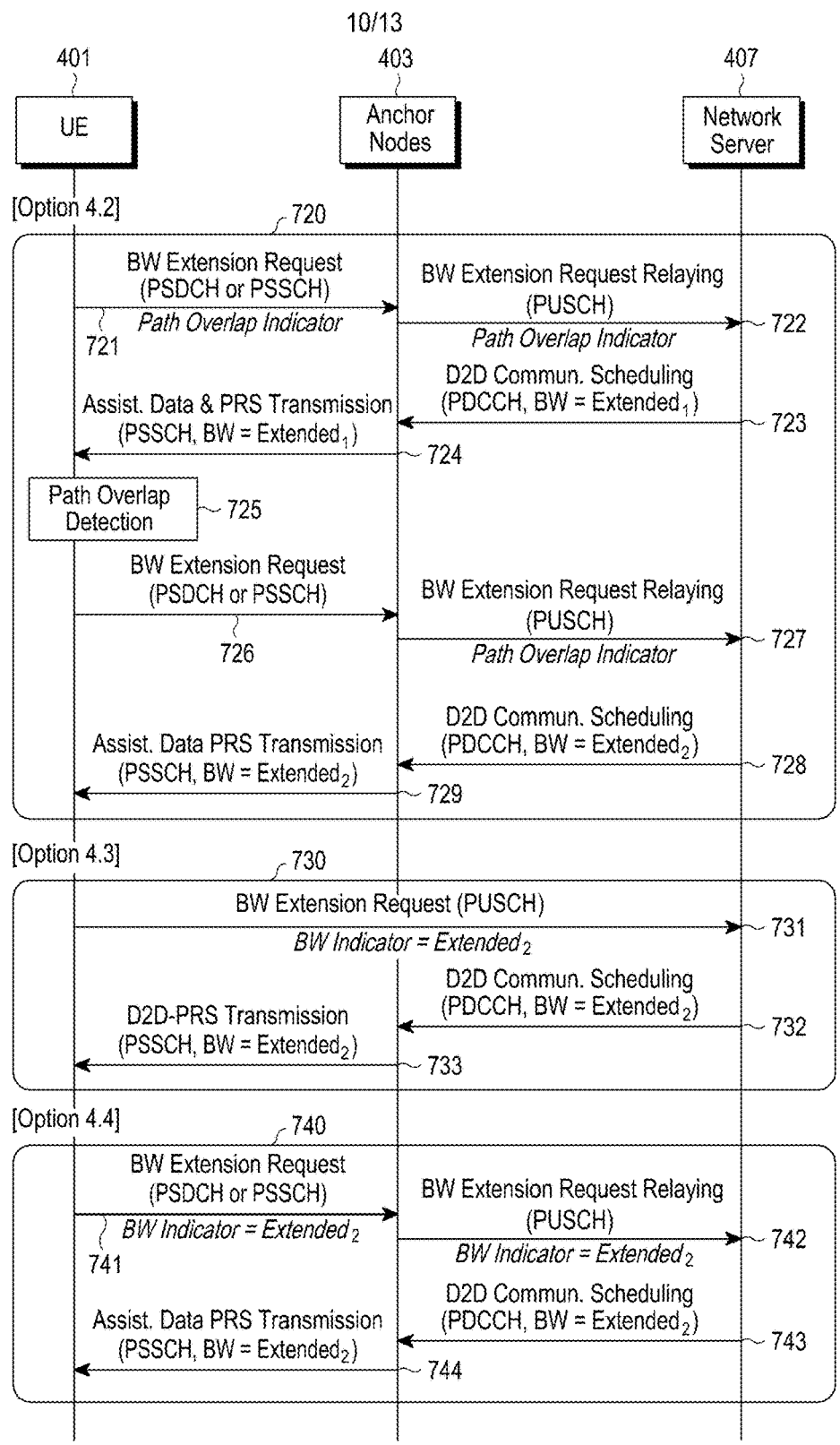

FIGS. 7a and 7b are views illustrating available options for detection of a path overlap and requesting of BW extension in operation 417 of FIG. 4.

As described before, the PRS-receiving entity determines whether a path overlap has occurred due to multiple paths and how much paths have been overlapped, and requests retransmission of a PRS in an extended BW according to the determination in operation 417 of FIG. 4. Scheduling for PRS retransmission and transmission and reception of related assistant data are performed according to the request.

To perform the PRS retransmission and assistant data transmission/reception, the same option or a different option may be used depending on which option is used to perform PRS scheduling and assistant data transmission/reception among <Option 2.1> to <Option 2.12> illustrated in FIGS. 6a and 6b in operation 413 of FIG. 4.

Hereinbelow, a procedure for extending a BW in the case where <Option 2.2> of FIG. 6a is used in operation 413 of FIG. 4 and PRS scheduling and assistant data transmission are performed in the same manner as in <Option 2.2> in operation 417 of FIG. 4 will be described. However, the same BW extension procedure may be applied to many options other than described below, with a modification.

In FIGS. 7a and 7b, it is assumed that <Option 2.2> of FIG. 6a is used in operation 413 of FIG. 4 and PRS scheduling and assistant data transmission are performed in the same manner as in <Option 2.2> in operation 417 of FIG. 4.

In all cases described below, an operation for determining whether a path overlap has occurred and how much the path overlap is precedes in the UE 401 receiving a PRS. For the operations subsequent to the path overlap detection operation, the following four options are available according to an entity receiving a BW extension request from the PRS-receiving UE 401 and how a BW is extended. The four options are referred to as <Option 4.1> 710 and <Option 4.4> 740, for the convenience.

In <Option 4.1> 710, upon detection of a path overlap, the PRS-receiving entity transmits a BW Extension Request signal to the network sever 407. The PRS-receiving entity may indicate the need for BW extension to the network server 407 by a 1-bit path overlap indicator, or may indicate the degree of the path overlap to the network server 407 by a path overlap indicator including a plurality of bit streams.

Meanwhile, upon receipt of the BW Extension Request message from the UE 401, the network server 407 may determine an extended BW. For example, the network server 407 may determine an extended PRS BW in consideration of D2D traffic load of a cell or scheduling priority.

In another example, upon receipt of the BW Extension Request message from the UE 401, the network server 407 may extend a BW stepwise according to a predetermined BW level in consideration of a current PRS BW. For example, referring to 710 of FIG. 7a, upon receipt of the BW Extension Request message from the PRS-receiving entity which has received a PRS in an initial BW in operation 711, the network server 407 may re-schedule PRSs for the anchor nodes 403 according to a predefined BW, Extended$_1$ in operation 712. The anchor nodes 403 transmit assistant data and PRSs in the BW, Extended$_1$ to the UE 401 in operation 713. Upon detection of a path overlap in the PRSs received in the BW, Extended$_1$ in operation 714, the UE 401 may transmit the BW Extension Request message again to the network server 407 in operation 715. The network server 407 may re-schedule PRSs in a BW Extended$_2$ larger than Extended$_1$ for the anchor nodes 403 in operation 716. The anchor nodes 403 transmit assistant data and PRSs in the BW, Extended$_2$ to the UE 401 in operation 717.

In another example, if the PRS-receiving entity indicates the degree of a path overlap by a path overlap indicator including a plurality of bit streams, the network server 407 may determine a BW based on the degree of the path overlap. That is, considering that a larger BW is required for a larger path overlap, the increment of a PRS BW may be determined in proportion to the degree of the path overlap.

Meanwhile, the extended PRS BW is determined to be equal to or smaller than a maximum PRS BW determined by the network server 407. Herein, the PRS BW may be set to a value exceeding the maximum BW of one component carrier (CC), 20 MHz by carrier aggregation (CA). In this case, CCs aggregated for a scheduled PRS in CA from among available CCs of each eNB 405 may be predetermined or determined by the network server 407. Meanwhile, when the transmission BW of the PRS to which CA is applied is extended, the network may also transmit information about the CCs in which the PRS is to be transmitted during transmission of PRS scheduling information to the PRS-transmitting entity.

After PRS transmission in a BW extended in the above manner is scheduled, assistant data is transmitted to the PRS-receiving entity in the same manner as in operation 413 of FIG. 4 and a PRS signal is transmitted and received in the same manner as in operation 415 of FIG. 4.

In <Option 4.2> 720, upon detection of a path overlap, the PRS-receiving UE 401 transmits a BW Extension Request message to the anchor nodes 403 transmitting PRSs in operation 721. The BW Extension Request signal may be transmitted on a PSDCH defined for discovery of D2D UEs 401 or a PSSCH defined for D2D communication. The anchor nodes 403 request rescheduling of PRSs in an extended BW by forwarding the BW Extension Request to the network server 407 in operation 722. Subsequently, PRSs are retransmitted in an extended BW in a similar manner to in operations 712 to 717 of <Option 4.1> 710, in operations 723 to 729. <Option 4.2> 720 differs from <Option 4.1> 710 in that the UE 401 directly transmits the BW Extension Request message to the PRS-transmitting anchor nodes 403 in operations 721 and 726.

In <Option 4.3> 730, upon detection of a path overlap, the PRS-receiving UE 401 transmits a BW indicator to the network server 407 in operation 731. The BW indicator is information indicating a BW required to detect an RSTD with a sufficient accuracy. The BW indicator may be configured in a predetermined number of bit streams, indicating the number of resource blocks (RBs) along the frequency axis or an index indicating one of predetermined BW levels.

The UE 401 may determine its required BW and indicate the determined BW using the BW indicator. The BW required for the UE 401 may be determined based on the degree of a path overlap.

For example, the degrees of path overlaps are classified as a plurality of levels. When a path overlap of a specific level occurs, the UE 401 may determine the value of a BW indicator to be a BW required to eliminate the path overlap of the specific level. In another example, the UE 401 may pre-store information about RSTD estimation accuracies with respect to path overlap degrees in a table by simulation-based analysis or receive the table from the network server 407. The UE 401 may determine a required BW in consideration of the degree of a path overlap and/or an RSTD estimation accuracy required for each application based on the information about RSTD estimation accuracies, and request the determined BW using a BW indicator.

After the UE 401 requests the required BW as described above, the network server 407 schedules PRS retransmission of the requested BW for the anchor nodes 403 in operation 532, and the anchor nodes 403 transmit necessary assistant data and retransmit PRSs in operation 733.

In <Option 4.4> 740, upon detection of a path overlap, the PRS-receiving UE 401 directly transmits a BW indicator to the PRS-transmitting anchor nodes 403 in operation 741. Upon receipt of the BW indicator, the anchor nodes 403 request scheduling for PRS retransmission in a requested BW to the network server 407 in operation 742. Then, PRSs are retransmitted in a BW extended in the same manner as in <Option 4.3>. Compared to <Option 4.3>, the UE 401 transmits a BW indicator to the network server 407 not directly but via the anchor nodes 403 in <Option 4.4> 740. Thus, the UE 401 may transmit a BW Extension Request message on a PSDCH or PSSCH to the anchor nodes 403, and the anchor nodes 403 may request scheduling request through a PUSCH.

Figure 8:
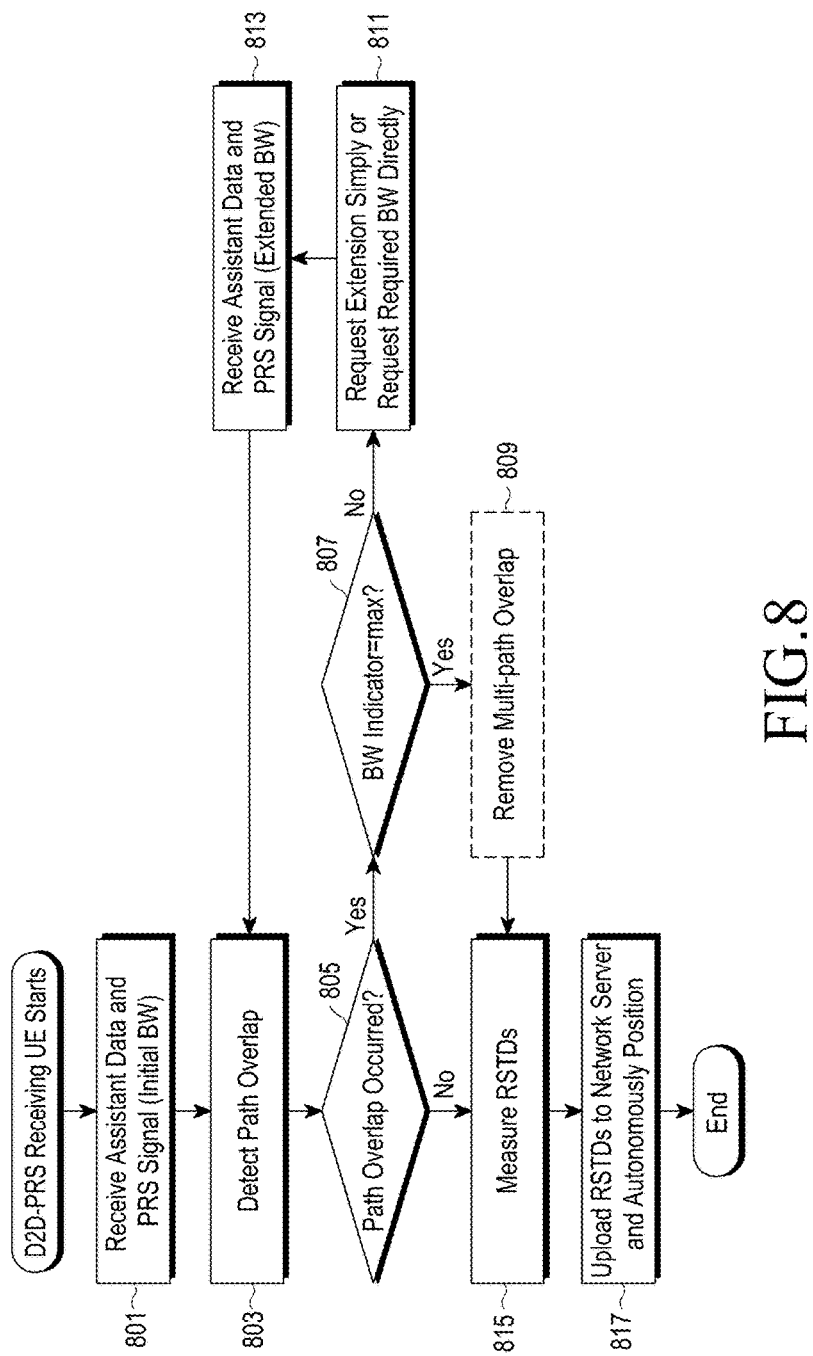
FIG. 8 is a flowchart illustrating an operation of a user equipment (UE) receiving a PRS according to an embodiment of the present disclosure.

FIG. 8 is a flowchart illustrating an operation of a UE receiving a PRS according to an embodiment of the present disclosure.

In operation 801, the UE receives a PRS in an initial BW and assistant data required for the PRS reception. The UE performs a path overlap detection operation in operation 803 and determines whether a path overlap has been detected in operation 805. Upon detection of no path overlap, the UE is capable of measuring an RSTD using the PRS in the current BW. Therefore, the UE measures an RSTD in operation 815 and uploads the measured RSTD to a network server or estimates its position in operation 817.

Upon detection of a path overlap in operation 805, the UE determines whether the current PRS BW is a maximum available BW using a BW indicator in operation 807. Information about the maximum BW may be acquired from configuration information about PRS BW levels. If the current PRS BW is the maximum BW, it is impossible to extend the PRS BW. Accordingly, the UE performs an operation for eliminating the multipath overlap in operation 809 and measures an RSTD in operation 815. However, operation 809 is not mandatory and may be performed when a path overlap needs to be eliminated. The multipath overlap removal will be described later in detail.

If the current PRS BW is not the maximum BW, it is possible to extend the PRS BW. Therefore, the UE requests BW extension to a PRS-transmitting entity or the network server in operation 811. Thus, the UE transmits a BW Extension Request message to the network server or an anchor node. The BW Extension Request message may be a simple message requesting BW extension, or a message requesting a BW determined by the UE. Subsequently, the UE receives assistant data and a PRS in an extended BW in operation 813. The UE returns to operation 803 in which the UE performs the path overlap detection operation again.

A description will be given of a method for detecting a path overlap, proposed by the present disclosure.

Figure 9A:
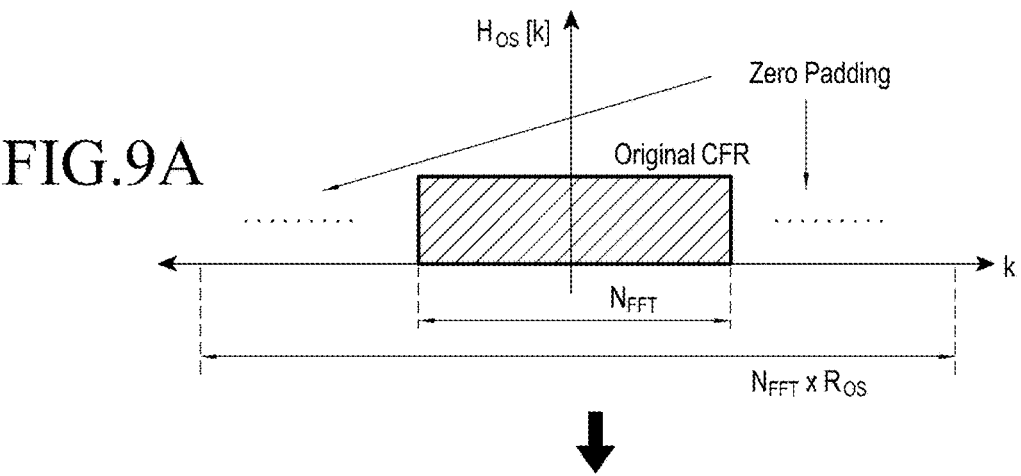
FIG. 9 is a view depicting a method for detecting occurrence of an overlap between paths according to an embodiment of the present disclosure.
Figure 9B:
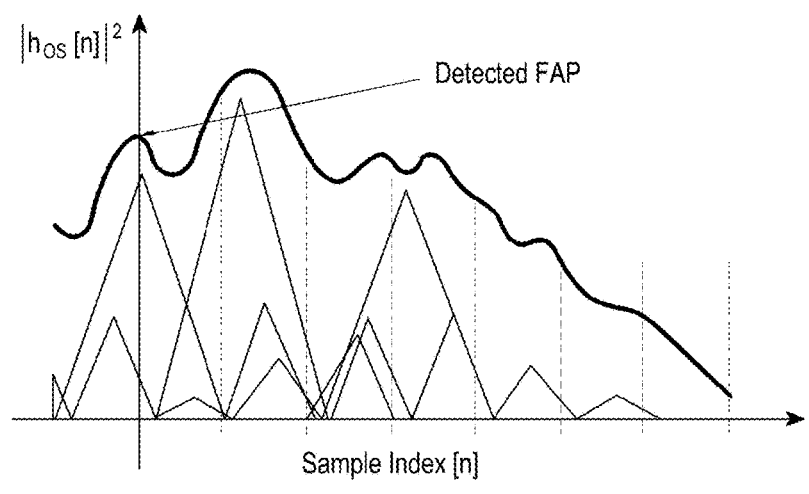
Figure 9C:
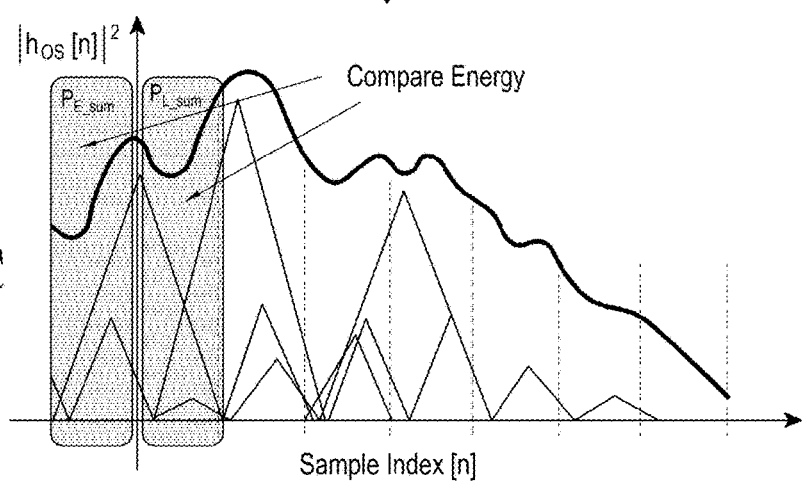

FIG. 9 is a view depicting a method for detecting occurrence of a path overlap according to an embodiment of the present disclosure.

Based on the idea that when a path overlap occurs, the CIR symmetry is destroyed, it may be determined whether a path overlap has occurred by evaluating the symmetry of a CIR in the present disclosure.

In the present disclosure, an FTO is estimated and corrected. If a sampling point converges to a specific position as tracking is completed, an oversampled CIR is acquired from a CFR acquired from the sampling timing. For an original FFT size, $N_{FFT}$ and an oversampling rate, $R_{os}$, the oversampled CIR ($h_{os}<n>$) may be obtained by IFFT-processing subcarriers to the left and right of the original CFR in a size of $R_{os} \times N_{FFT}$ after zero padding. The operation may be expressed as [Equation 6] and [Equation 7].

$$H_{OS}(k) = \begin{cases} H\left(k - \frac{N_{FFT} \cdot (R_{OS} - 1)}{2}\right), & \text{if } \frac{N_{FFT}(R_{OS} - 1)}{2} \leq k < \frac{N_{FFT}(R_{OS} + 1)}{2}, \\ 0, & \text{otherwise.} \end{cases}$$ [Equation 6]

$$h_{os}[n] = \text{IFFT}\{H_{os}(k)\}$$ [Equation 7]

Meanwhile, for the oversampled CIR, power sums of a +0.5 Ts range and a −0.5 Ts range with respect to the FAP may be calculated by [Equation 8] and [Equation 9].

$$P_{E\_sum} = \sum_{i=0}^{\frac{R_{OS}}{2}-1} |h_{OS}[(R_{OS} \cdot N_{FFT} - i) \bmod R_{OS} \cdot N_{FFT}]|^2$$ [Equation 8]

$$P_{L\_sum} = \sum_{i=0}^{\frac{R_{OS}}{2}-1} |h_{OS}[(R_{OS} \cdot N_{FFT} + i) \bmod R_{OS} \cdot N_{FFT}]|^2$$ [Equation 9]

If the difference between $P_{E\_sum}$ and $P_{L\_sum}$ is equal to or larger than a predetermined threshold, it may be determined that the CIR symmetry has been destroyed due to a path overlap. Further, the degree of the path overlap may be determined according to the difference between $P_{E\_sum}$ and $P_{L\_sum}$. That is, as the difference between $P_{E\_sum}$ and $P_{L\_sum}$ is wider, the path overlap may be determined to be greater.

The UE may request BW extension using the afore-described BW indicator, while requesting a BW in proportion to the degree of the path overlap.

Now, a description will be given of a method for cancelling interference caused by a path overlap component, as described with reference to operation 809 of FIG. 8.

A UE receiving a PRS in an increased BW may increase the accuracy of RSTD estimation by correcting an FTO through application of a reception technology based on the ELD algorithm described with reference to FIG. 8 in the procedure of FIG. 4. However, even though two or three consecutive CCs are aggregated, a main lobe overlap may still occur.

For example, referring to [Table 1], it may be noted that even though an RS BW of 60 MHz is secured by aggregating three 20-MHz CCs, 3GPP extended pedestrian A (EPA) and 3GPP extended vehicle A (EVA) channel models experience a main lobe overlap between an FAP and an SAP. Therefore, inter-path interference (IPI) caused by a path overlap still remaining after reception of a PRS in an extended BW may be iteratively cancelled and then the ELD operation of FIG. 3 may be performed, to thereby increase an RSTD estimation accuracy in the present disclosure.

Figure 10:
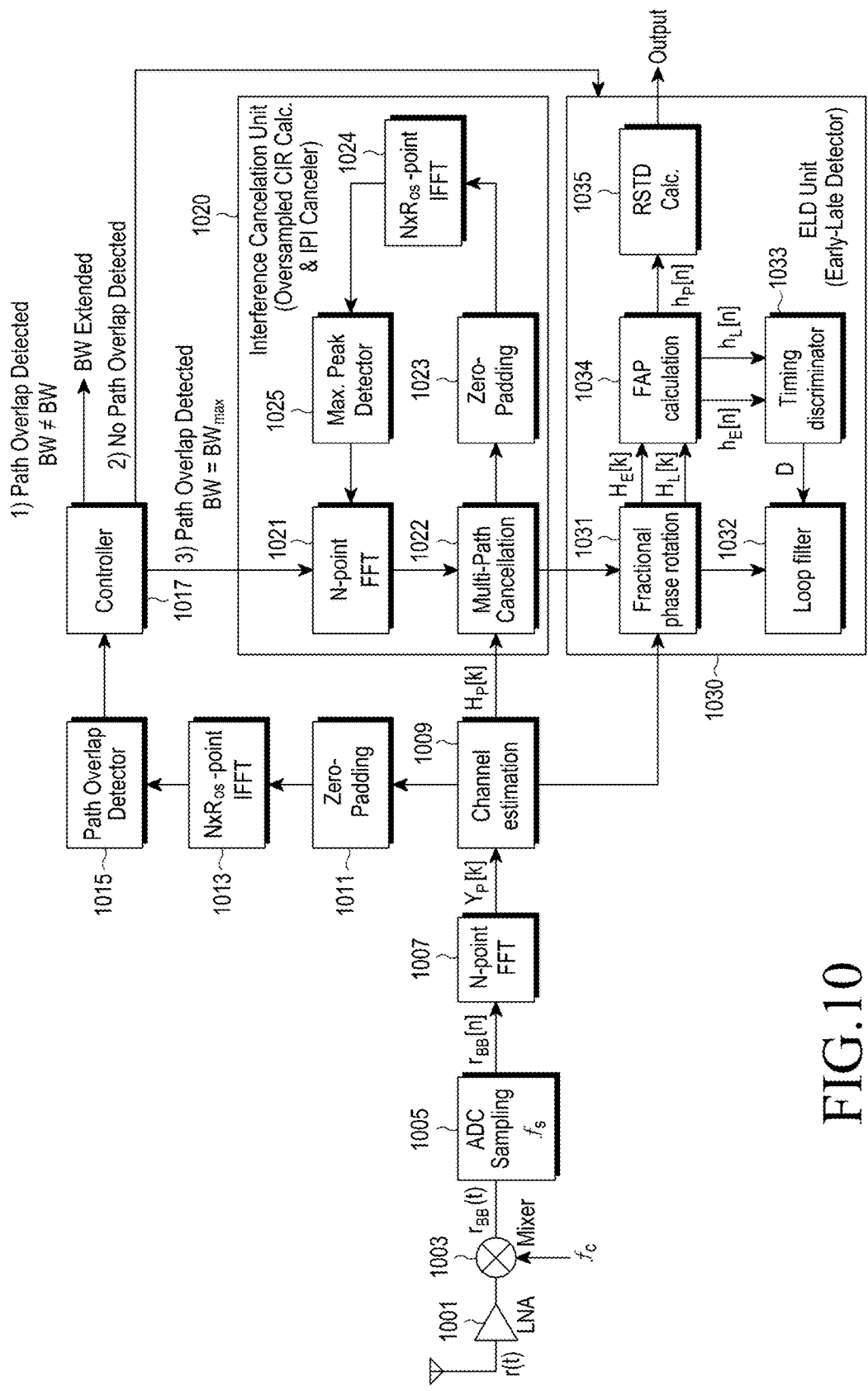
FIG. 10 is a block diagram of a receiver for performing an operation including an iterative inter-path interference (IPI) cancellation method according to an embodiment of the present disclosure.

FIG. 10 is a block diagram of a receiver for performing an operation including an iterative IPI cancellation method according to an embodiment of the present disclosure.

The following description focuses on only components of the receiver, which are related to the present disclosure.

A path overlap detector 1015 acquires an oversampled CIR, and determines whether a path overlap has occurred based on CIR symmetry. A controller 1017 controls operations in three cases depending on whether a path overlap has occurred.

(1) If a path overlap is detected but the BW of a current received PRS is not a maximum BW, the controller 1017 requests BW extension in one of the afore-described <Option 4.1> to <Option 4.4>.

(2) If no path overlap is detected, the controller 1017 controls an ELD unit 1030 to perform the ELD operation of FIG. 3, to thereby perform accurate FTO correction and RSTD detection.

(3) If a path overlap is detected even though the current received BW is the maximum available BW, the controller 1017 controls an interference controller 1020 to perform an IPI cancellation operation proposed by the present disclosure.

The interference canceler 1020 operates based on the oversampled CIR in the same manner as in the afore-described path overlap detection method. That is, the interference canceler 1020 iteratively cancels IPI in the following procedure after an oversampled CIR is obtained by [Equation 7] through IFFT of a CFR measured from a PRS received in an increased BW.

(1) A maximum peak detector 1025 detects the maximum peak of the oversampled CIR.

(2) An N-point FFT unit 1021 acquires a CFR corresponding to a corresponding CIR path by FFT-processing a maximum peak CIR component.

(3) A multipath remover 1022 subtracts the CFR obtained in step (2) from an original CFR.

(4) An IFFT unit 1024 acquires a CIR with a specific path removed by IFFT-processing the result of step (3).

(5) The above steps are repeated until there is no CIR path having power equal to or higher than a threshold.

If the interference canceler 1020 repeats the above steps (1) to (5) in this manner, it may separate each path component of a multipath channel. After separating all paths, the interference canceler 1020 may determine a path having the shortest time delay as an FAP from among paths having power exceeding a threshold, and remove CIR paths except for the FAP by subtracting CFRs of all paths except for the determined FAP from the initially estimated CFR. Subsequently, the ELD unit 1030 may perform the ELD operation using only the CFR of the FAP, thus making accurate FTO correction and RSTD detection possible.

According to the embodiments of the present disclosure as described so far, it may be determined whether a path overlap has occurred due to NLOS paths in a wireless communication environment. If a path overlap is detected, PRS transmission in an extended BW may be requested, a PRS may be received in the extended BW, and thus the path overlap may be eliminated. Further, if a path overlap has occurred in the case where a PRS is received in a maximum system BW, a path overlap component may be removed. The resulting increase of RSTD detection performance in a UE may lead to accurate positioning. Further, as a BW required for RSTD detection is determined adaptively, the use efficiency of radio resources may be increased.

The afore-described specific aspects of the present disclosure may be implemented as computer-readable code in a computer-readable recoding medium. The computer-readable recording medium may be any recording device that stores data readable by a computer system. Examples of the computer-readable recording medium include read only memory (ROM), random access memory (RAM), compact disk-read only memory (CD-ROM), magnetic tape, floppy disk, optical data storage device, and carrier waves (such as data transmission over the Internet). In addition, the computer-readable recording medium may be distributed over computer systems connected over a network, and computer-readable codes may be stored and executed in a distributed manner. Also, programmers skilled in the art of the present disclosure may readily interpret functional programs, code, and code segments for implementing the present disclosure.

The method and apparatus according to an embodiment of the present disclosure may be implemented in hardware, software, or a combination of hardware and software. The software may be stored, for example, irrespective of erasable or rewritable, in a volatile or non-volatile storage device such as a storage device like ROM, a memory such as RAM, a memory chip, or an integrated circuit (IC), or an optically or magnetically writable and machine-readable (for example, computer-readable) storage medium such as CD, digital versatile disk (DVD), magnetic disk, or magnetic tape. The method according to the embodiment of the present disclosure may be implemented by a computer or a portable terminal including a controller and a memory. The memory is an example of a machine-readable storage medium suitable for storing a program or programs including instructions that implement embodiments of the present disclosure.

Accordingly, the present disclosure includes a program including code for implementing the apparatus or method as disclosed in the claims and a machine-readable storage medium that stores the program. Also, this program may be electronically transferred through a medium such as a communication signal transmitted by wired or wireless connection and the present disclosure includes its equivalents appropriately.

The apparatus according to the embodiment of the present disclosure may receive a program from a wiredly or wirelessly connected program providing device and store the program. The program providing device may include a program having instructions for implementing a predetermined method for protecting content, a memory for storing information needed for the content protection method, a communication unit for conducting wired or wireless communication with a graphic processing device, and a controller for transmitting the program to a transceiver upon request of the graphic processing device or automatically.

The invention claimed is:

1. A method for supporting positioning of a user equipment (UE) in a wireless communication system, the method comprising:
    receiving a reference signal (RS) in a first bandwidth from each of a plurality of anchor nodes scheduled for RS transmission by a network server;
    determining whether a path overlap has occurred between the UE and the anchor nodes based on symmetry of channel impulse responses of the received RSs;
    transmitting a bandwidth extension request message to the network server, upon occurrence of the path overlap;
    receiving an RS in a second bandwidth from each of the plurality of anchor nodes in response to the transmission of the bandwidth extension request message, wherein the second bandwidth is larger than the first bandwidth; and
    generating information required to position the UE, using the RSs received in the second bandwidth.

2. The method according to claim 1, further comprising:
    if a path overlap has not occurred:
        calculating a reference signal time difference (RSTD), wherein the RSTD is a difference between reception times of the received RSs; and
        transmitting the calculated RSTD to the network server.

3. The method according to claim 1, further comprising receiving, from each of the anchor nodes, assistant data for RS reception.

4. The method according to claim 3, wherein the assistant data includes transmission time information about the RSs and position information about the anchor nodes.

5. The method according to claim 1, wherein the transmission of a bandwidth extension request message to the network server includes transmitting the bandwidth extension request message to the network server if the first bandwidth is less than a maximum available bandwidth.

6. The method according to claim 1, further comprising, upon occurrence of the path overlap, if the first bandwidth is a maximum available bandwidth, removing the path overlap in the RSs received in the first bandwidth.

7. The method according to claim 1, further comprising transmitting a positioning request message to the network server.

8. The method according to claim 1, wherein the bandwidth extension request message includes a path overlap indicator indicating whether a path overlap has occurred and how much the path overlap is.

9. A method for supporting positioning of a user equipment (UE) by a network server in a wireless communication system, the method comprising:
    scheduling transmission of a reference signal (RS) in a first bandwidth for each of a plurality of anchor nodes;
    receiving a bandwidth extension request message from the UE if the UE receiving the RSs in the first bandwidth detects a path overlap between the UE and the anchor nodes based on symmetry of channel impulse responses of the RSs; and
    scheduling RS transmission in a second bandwidth larger than the first bandwidth for each of the plurality of anchor nodes, wherein the RSs transmitted in the second bandwidth are used to position the UE.

10. The method according to claim 9, further comprising: receiving, from the UE, information about a reference signal time difference (RSTD) if a path overlap is not detected in the UE, wherein the RSTD is a difference between reception times of the received RSs, calculated by the UE.

11. The method according to claim 9, wherein the bandwidth extension request message includes a path overlap indicator indicating whether a path overlap has occurred and how much the path overlap is.

12. The method according to claim 11, wherein the second bandwidth is determined by the network server based on the path overlap indicator.

13. The method according to claim 9, further comprising receiving a positioning request message from the UE.

14. The method according to claim 13, wherein the positioning request message includes information about a list of anchor nodes neighboring to the UE.

15. A user equipment (UE) supported position of the UE by a network server in a wireless communication system, the UE comprising:
at least one processor configured to:
receive a reference signal (RS) in a first bandwidth from each of a plurality of anchor nodes scheduled for RS transmission by the network server;
determine whether a path overlap has occurred between the UE and the anchor nodes based on symmetry of channel impulse responses of the received RSs;
transmit a bandwidth extension request message to the network server, upon occurrence of a path overlap;
receive an RS in a second bandwidth larger than the first bandwidth from each of the plurality of anchor nodes in response to the transmission of the bandwidth extension request message; and
generate information required to position the UE, using the RSs received in the second bandwidth.

16. The UE of claim 15, wherein the at least one processor is further configured to:
if a path overlap has not occurred:
calculate a reference signal time difference (RSTD), wherein the RSTD is a difference between reception times of the received RSs; and
transmit the calculated RSTD to the network server.

17. The UE of claim 15, wherein the at least one processor is further configured to:
receive assistant data from each of the anchor nodes, for RS reception.

18. A network server supporting positioning of a user equipment (UE) in a wireless communication system, the network server comprising:
at least one processor configured to:
schedule transmission of a reference signal (RS) in a first bandwidth for each of a plurality of anchor nodes;
receive a bandwidth extension request message from the UE if the UE receiving the RSs in the first bandwidth detects a path overlap between the UE and the anchor nodes based on symmetry of channel impulse responses of the RSs; and
schedule RS transmission in a second bandwidth larger than the first bandwidth for each of the plurality of anchor nodes,
wherein the RSs transmitted in the second bandwidth are used to position the UE.

19. The network server of claim 18, wherein the at least one processor is further configured to:
receive, from the UE, information about a reference signal time difference (RSTD) if a path overlap has not detected in the UE, wherein the RSTD is a difference between reception times of the received RSs, calculated by the UE.

20. The network server of claim 18,
wherein the bandwidth extension request message includes a path overlap indicator indicating whether a path overlap has occurred and how much the path overlap is.

* * * * *